United States Patent
Lee

(10) Patent No.: US 10,820,229 B2
(45) Date of Patent: Oct. 27, 2020

(54) METHOD FOR PROVIDING STREAMING SERVICE AND APPARATUS THEREFOR

(71) Applicant: SK TELECOM CO., LTD., Seoul (KR)

(72) Inventor: Jongmin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 23 days.

(21) Appl. No.: 16/464,641

(22) PCT Filed: May 24, 2017

(86) PCT No.: PCT/KR2017/005389
§ 371 (c)(1),
(2) Date: May 28, 2019

(87) PCT Pub. No.: WO2018/101554
PCT Pub. Date: Jun. 7, 2018

(65) Prior Publication Data
US 2019/0387426 A1    Dec. 19, 2019

(30) Foreign Application Priority Data

Nov. 29, 2016  (KR) .................. KR10-2016-0160820
Jan. 10, 2017  (KR) .................. KR10-2017-0003834

(51) Int. Cl.
*H04W 28/02*  (2009.01)
*H04L 29/06*  (2006.01)
(Continued)

(52) U.S. Cl.
CPC ......... *H04W 28/0236* (2013.01); *H04L 65/60* (2013.01); *H04W 28/0226* (2013.01);
(Continued)

(58) Field of Classification Search
None
See application file for complete search history.

(56) References Cited

U.S. PATENT DOCUMENTS 8,964,701 B2 * 2/2015 Hamabe ................ H04W 36/32
                                                              370/332
2008/0108353 A1 * 5/2008 Lee ................... H04W 36/0061
                                                              455/437
(Continued)

FOREIGN PATENT DOCUMENTS

KR  10-2013-0137679 A   12/2013
KR  10-2014-0111407 A    9/2014
(Continued)

OTHER PUBLICATIONS

PCT International Search Report (with English translation) and Written Opinion, International Application No. PCT/KR2017/005389, dated Aug. 28, 2017, 12 Pages.
(Continued)

*Primary Examiner* — Eunsook Choi
(74) *Attorney, Agent, or Firm* — Fenwick & West LLP

(57) ABSTRACT

The present invention relates to a method for providing a streaming service and an apparatus therefor, the method and apparatus allowing streaming data to be provided by changing into service quality suitable for a busy cell in advance, before a terminal enters the busy cell, so as to prevent sudden changes in image quality when the terminal enters the busy cell, thereby enabling a deterioration, which is recognizable by a user, in the image quality to be minimized and a streaming service to be seamlessly used.

14 Claims, 12 Drawing Sheets

(51) Int. Cl.
*H04W 36/00* (2009.01)
*H04W 36/18* (2009.01)

(52) U.S. Cl.
CPC ... *H04W 28/0284* (2013.01); *H04W 36/0061* (2013.01); *H04W 36/18* (2013.01)

(56) References Cited

U.S. PATENT DOCUMENTS

| | | | |
|---|---|---|---|
| 2013/0143526 A1* | 6/2013 | Kanugovi | H04W 36/00835 455/411 |
| 2013/0170362 A1* | 7/2013 | Futaki | H04W 24/02 370/241.1 |
| 2013/0196650 A1* | 8/2013 | Futaki | H04W 24/10 455/424 |
| 2014/0162635 A1* | 6/2014 | Cui | H04W 48/18 455/434 |
| 2015/0038140 A1* | 2/2015 | Kilpatrick, II | H04W 68/02 455/436 |
| 2015/0173011 A1* | 6/2015 | Das | H04W 24/02 370/328 |
| 2016/0374006 A1* | 12/2016 | Chen | H04W 74/0833 |
| 2017/0064691 A1* | 3/2017 | Kubota | H04W 48/18 |
| 2017/0289937 A1* | 10/2017 | Urabayashi | H04W 48/16 |
| 2018/0020486 A1* | 1/2018 | Yano | H04W 72/0486 |

FOREIGN PATENT DOCUMENTS

| | | |
|---|---|---|
| KR | 10-2014-0144066 A | 12/2014 |
| WO | WO-2015-093912 A1 | 6/2015 |

OTHER PUBLICATIONS

Lee, J., "Network Assisted Adaptive Streaming for Mobile MMT," ISO/IEC JTC1/SC29/WG11, MPEG2016/ m39197, Oct. 2016, Chendu, China, 5 Pages.

* cited by examiner

METHOD FOR PROVIDING STREAMING SERVICE AND APPARATUS THEREFOR

CROSS-REFERENCE TO RELATED APPLICATIONS

This application is the National Stage of International Application No. PCT/KR2017/005389, filed on May 24, 2017, which claims the benefit of and priority to Korean Patent Application No. 10-2016-0160820, filed on Nov. 29, 2016, and Korean Patent Application No. 10-2017-0003834, filed on Jan. 10, 2017, the contents of which are incorporated by reference in their entirety.

TECHNICAL FIELD

The present invention relates to a streaming service and, more particularly, to a streaming service providing method and apparatus for providing streaming data by adaptively changing a service quality in consideration of a congestion state of a cell.

BACKGROUND ART

Descriptions made in this section merely provide background information of embodiments of the present invention and do not constitute conventional art.

Streaming refers to the transmission of content, such as video or audio, from a server to a client terminal over a network such as the Internet. Since data is processed as if water is flowing, it is called streaming. The streaming server divides the data into a plurality of streaming data packets to be delivered to the client terminal via the network. The client terminal collects such packets received from the server, restores the packets to their original form, and plays them. The reception and playback of packets occur simultaneously, and a series of related packets is called a stream.

In such a streaming service, the demand for high-quality live broadcasting, especially the demand for real-time live streaming service in a smart phone, is increasing explosively. Accordingly, in order to meet such demand, an adaptive streaming service for providing a streaming service smoothly has attracted attention.

The adaptive streaming service is proposed to consider various network environments in a rapidly changing mobile environment and thus means a scheme of variably changing the transmission quality of the streaming service according to variations in the transmission bandwidth or variations in the performance of a user device. In a typical adaptive streaming service, the same videos encoded with different bit rates according to service transmission qualities are stored in the form of chunks into which the video is divided with a certain length. In this state, the terminal checks periodically a variable reception environment and receives a video of the most suitable bit rate from the streaming server by request. This scheme, however, has a problem that only the environment of the network to which the terminal is currently connected is considered.

That is, when the terminal of the user moves from a high-quality network environment to a congested network environment, the typical adaptive streaming service changes an image quality just after the time point of such movement. Therefore, until the image quality is changed, the user may experience a poor image quality. In addition, there is a problem that it takes a certain time to change the image quality.

Accordingly, it is necessary to develop a technique capable of detecting a mobile environment of a user terminal in advance and adaptively providing a streaming service.

DISCLOSURE

Technical Problem

In order to solve the above-discussed problems, the present invention has an object of providing a streaming service providing method and apparatus capable of providing streaming data by adaptively changing a service quality in consideration of mobility of a terminal.

In particular, the present invention has an object of providing a streaming service providing method and apparatus capable of requesting and receiving streaming data by adaptively changing a service quality in consideration of a congestion state of a cell disposed in a moving direction of a terminal that desires to use a streaming service.

However, the present invention is not limited to the above objects, and any other object, even though not mentioned herein, may be well understood from the following description.

Technical Solution

In order to accomplish the above objects, according to an embodiment of the present invention, a streaming service providing method of a terminal may include receiving a network congestion status message containing service quality information about at least one cell from a streaming server; identifying a service quality corresponding to a neighboring cell located in a moving direction of the terminal, based on the network congestion status message; and requesting and receiving streaming data from the streaming server, based on the identified service quality corresponding to the neighboring cell.

In the method, the network congestion status message may be generated based on cell information received from a base station, and the network congestion status message may contain a maximum bitrate (Max_bitrate) corresponding to at least one cell identification information (C_ID), or contains a maximum bitrate (Maximum_rate) corresponding to a mobile information descriptor (mobile_info_descriptor) including at least one cell identification information (current_cell_id).

In the method, the requesting and receiving streaming data may include transmitting a request for streaming data corresponding to the maximum bitrate to the streaming server; and receiving streaming data corresponding to the maximum bitrate or less from the streaming server.

In the method, the network congestion status message may contain, as the service quality information, a resolution (Forced_resolution) and frames per second (Forced_fps) both of which correspond to at least one cell identification information. In this case, the requesting and receiving streaming data may include transmitting a request for streaming data corresponding to the resolution and the frames per second to the streaming server; and receiving streaming data corresponding to the resolution and the frames per second from the streaming server.

The method may further include, after the requesting and receiving streaming data, performing connection with the neighboring cell and then, when determining that the terminal gets out of the neighboring cell, requesting and receiving streaming data corresponding to an original service quality.

In order to accomplish the above objects, according to an embodiment of the present invention, a streaming service providing method of a streaming server may include identifying a cell congestion information message generated using cell information received from a base station; configuring, by using the cell congestion information message, a network congestion status message containing service quality information about at least one cell; transmitting the generated network congestion status message to a terminal; and transmitting streaming data according to the network congestion status message in response to a request of the terminal.

In the method, the cell congestion information message may be generated to contain cell identification information (C_ID) identified through the cell information received from the base station, a congestion level (Congestion_level) indicating a degree of congestion of a cell corresponding to the cell identification information, an event time (event_time), and an expiration time (expire_time).

In the method, the cell congestion information message may be generated to contain a mobile information descriptor (mobile_info_descriptor) including cell identification information (current_cell_id) identified through the cell information received from the base station, network level information (levelOthetworkstatus) about a congestion level of a cell corresponding to the cell identification information, a reporting time (reportingTime), and a valid duration (validDuration).

In the method, the network congestion status message may be configured to contain a maximum bitrate indicating a service quality determined in correspondence with the cell congestion information message, or configured to contain a resolution (Forced_resolution) and frames per second (Forced_fps).

In the method, the network congestion status message may be configured to further contain subscriber type information (priority_type) and a private field (private_field) including an application ID and a channel list, or configured to further contain a valid duration (validDuration) and a private length (private_length).

In the method, the transmitting streaming data may includes checking the subscriber type information (priority_type) and the private field (private_field) or checking the private_length, and transmitting the streaming data according to a service quality corresponding to a result of the checking when the checking result satisfies a predetermined condition.

In the method, the transmitting streaming data may include, when a request for transmission of streaming data corresponding to the network congestion status message is received from the terminal, determining whether there is streaming data corresponding to a maximum bitrate, and when there is no streaming data corresponding to the maximum bitrate, transmitting streaming data lower than the maximum bitrate to the terminal.

In addition, the present invention may provide a non-transitory computer-readable recording medium storing a program for executing the above-described method.

In order to accomplish the above objects, according to an embodiment of the present invention, a computer program stored in a non-transitory computer-readable recording medium may be implemented to execute steps of defining, based on cell information received from a base station, a cell congestion information message that contains a congestion level (Congestion_level) indicating a degree of congestion of a cell corresponding to cell identification information (C_ID) of the base station, an event time (event_time), and an expiration time (expire_time), or defining, based on a mobile information descriptor (mobile_info_descriptor) including identification information of an MMT receiving entity, a cell congestion information message that contains network level information (levelOfnetworkstatus) about a congestion level for a connected cell, a reporting time (reportingTime), and a valid duration (validDuration); and defining a network congestion status message that contains a maximum bitrate (Max_bitrate) indicating a service quality determined in correspondence with the congestion level, or contains a resolution (Forced_resolution) and frames per second (Forced_fps).

In order to accomplish the above objects, according to an embodiment of the present invention, a terminal may include a communication unit transmitting and receiving information to and from a streaming server; and a controller configured to receive a network congestion status message containing service quality information about at least one cell from a streaming server, to identify a service quality corresponding to a neighboring cell located in a moving direction of the terminal, based on the network congestion status message, and to request and receive streaming data from the streaming server, based on the identified service quality corresponding to the neighboring cell.

In order to accomplish the above objects, according to an embodiment of the present invention, a streaming server may include a server communication unit transmitting and receiving information to and from a terminal and transmitting streaming data to the terminal; and a server controller configured to identify a cell congestion information message generated using cell information received from a base station, to configure, by using the cell congestion information message, a network congestion status message containing service quality information about at least one cell, to transmit the generated network congestion status message to a terminal, and to transmit streaming data according to the network congestion status message in response to a request of the terminal.

Advantageous Effects

According to the streaming service providing method and apparatus of the present invention, the terminal requests streaming data by adaptively changing a service quality in consideration of a congestion state of a cell, and receives the streaming data with the changed service quality. It is therefore possible to use an adaptive streaming service considering the movement of the terminal.

In particular, before the terminal enters a congested cell, the terminal receives streaming data according to a service quality changed in advance to be suitable for the congested cell. Therefore, by preventing a sudden change in image quality when the terminal enters the congested cell, it is possible to minimize the deterioration of image quality that can be perceived by a user, and also provide a seamless streaming service.

Other various advantages and effects will be disclosed explicitly or implicitly in embodiments of this invention to be described below in detail.

MODE FOR INVENTION

Figure 1:
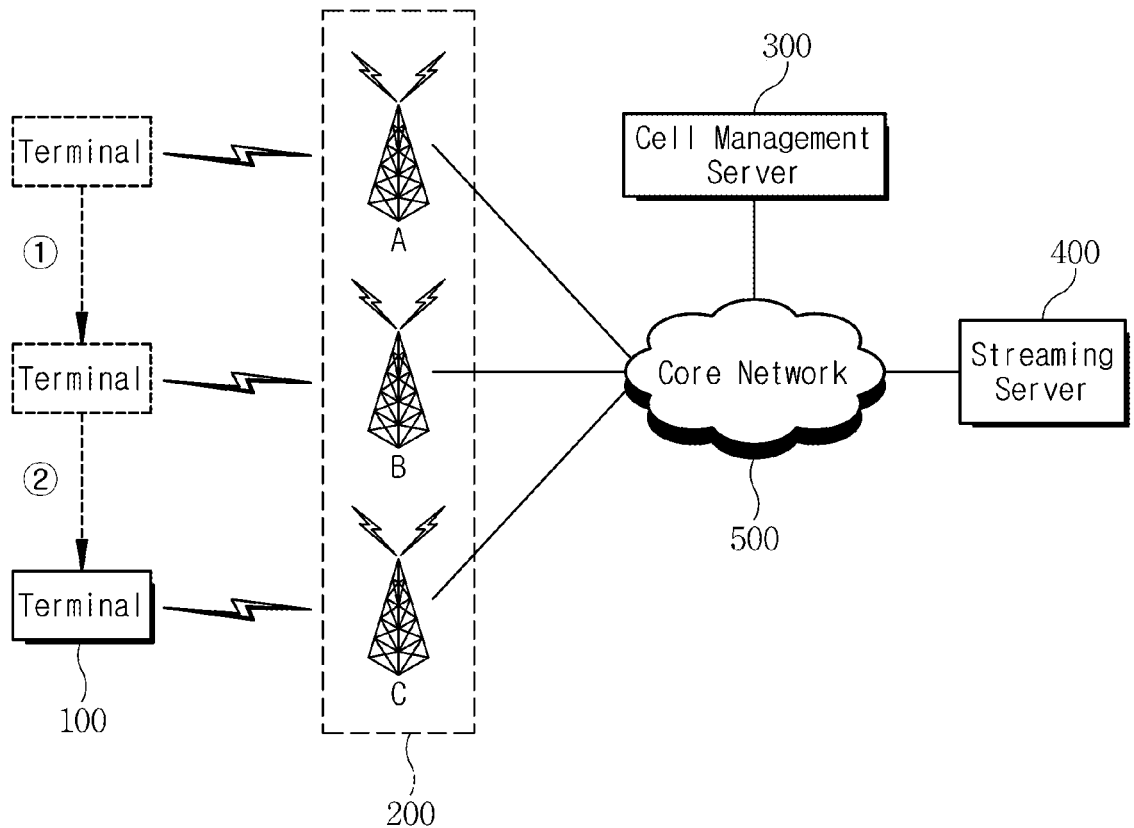
FIG. 1 is a diagram illustrating a main configuration of a streaming system according to an embodiment of the present invention.

Hereinafter, embodiments of the present invention will be described in detail with reference to the accompanying drawings.

In the following description and the accompanying drawings, well-known functions or elements may not be described or illustrated in detail to avoid obscuring the subject matter of the present invention. The same elements may be denoted by the same reference numerals throughout the drawings.

The terms and words used herein should not be construed as limited to ordinary or dictionary definition terms, but should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

In addition, a streaming service disclosed herein refers to providing various types of contents such as audio and/or video in a streaming manner. Here, streaming refers to a technique to enable the transmission and playback of a file to be performed together, thereby reducing a wait time and having no restraints in the storage capacity of a receiving end. In such streaming, there are VOD streaming for providing stored content by a user's request, and live streaming for broadcasting content data at a given time. A streaming service described in this disclosure is preferably, but not limited to, a live streaming service.

Now, a streaming system according to an embodiment of the present invention will be described.

FIG. 1 is a diagram illustrating a main configuration of a streaming system according to an embodiment of the present invention.

Referring to FIG. 1, the streaming system of the present invention may include a terminal 100, a base station 200, a cell management server 300, and a streaming server 400. The terminal 100 may access a core network 500 through the base station 200 and then communicate with the streaming server 400 via the base station 200 and the core network 500.

Hereinafter, respective elements constituting the streaming system will be described. First, the terminal 100 refers to a device capable of transmitting and receiving various kinds of data through an access network of the base station 200 and the core network 500 in response to a user's request. The terminal 100 may perform voice communication or data communication, and may request streaming data to the streaming server 400 to receive and play corresponding streaming data.

For this, the terminal 100 may perform a process of scanning signals transmitted from the base stations 200 located within a certain range. Then, the terminal 100 may be connected to one of the base stations (hereinafter, individually referred to as A, B, C, etc., or 200a, 200b, etc., or collectively referred to as 200) located within a certain range. When there are a plurality of base stations 200 within a certain range, the terminal 100 may perform a procedure of selecting a specific one of the plurality of base stations 200 and then connecting to the selected base station 200. This connection procedure between the terminal 100 and the base station 200 is well known in the art.

In addition, the terminal 100 may access the core network 500 via the connected base station 200 and also establish a control session with the streaming server 400 through the core network 500. Here, the control session may be established according to a transmission control protocol (TCP) communication procedure, but is not limited thereto.

In addition, the terminal 100 receives a streaming data transmission request for a specific content from a user. The streaming data transmission request for the specific content may be a user's input of entering a uniform resource locator (URL) for requesting the specific content through a browser or the like. Then, the terminal 100 accesses a name server such as a domain name server (DNS) and obtain address information (i.e., IP address) of the streaming server 400 that provides a streaming service for the corresponding content. Then, the terminal 100 sequentially receives streaming data from the streaming server 400 in packet units and sequentially reproduces the received streaming data. In particular, the terminal 100 may request, receive, and reproduce the content in the form of an MPEG media transport (MMT) packet. In addition, the MMT packets may be sequentially received in a streaming form, and thus the terminal 100 may process and reproduce the sequentially received MMT packets.

In order to perform the above-described process, the terminal 100 may include a memory for storing a browser, a program and a protocol therein, and a microprocessor for executing and controlling various programs.

Meanwhile, the terminal 100 may be continuously moved while the user is carrying it. While the terminal 100 is moved, the base station 200 connected to the terminal 100 continuously performs a connection procedure and a connection release procedure. For example, when the terminal 100 connected with the base station A is moved as indicated by reference numeral (①), the terminal 100 may release the connection with the base station A and perform a procedure of newly connecting with the neighboring base station B. similarly, when the terminal 100 is moved as indicated by reference numeral (②), the terminal 100 may release the connection with the base station B and perform a procedure of newly connecting with the neighboring base station C.

In this situation, a typical adaptive streaming service has a problem that the terminal 100 provides a streaming service by simply considering only the environment of a currently connected network. The present invention addresses this problem. When it is determined that the terminal 100 will move into the cell coverage of the base station B as indicated by reference numeral (①), the terminal requests in advance a streaming service with a service quality suitable for a network environment of the base station B before the occurrence of such movement. Then, the terminal receives streaming data corresponding to the changed service quality from the streaming server 400.

The plurality of base stations 200 may perform a function of delivering a call connection request of the terminal 100 to the core network 500, and also perform other functions such as baseband signal processing, signal conversion, signal transmission/reception, and the like. The base station 200 may be implemented as a base station transmission system (BTS) in a synchronous (e.g., CDMA) network, and a base station controller (BSC) that controls the base station may be included in the access network. Also, in an asynchronous (e.g., WCDMA) network, the BTS may be replaced with a NodeB, and the BSC may be replaced with a radio network controller (RNC). Further, in a long term evolution (LTE) network, they may be implemented as an eNodeB and a mobility management entity (MME), which are advanced base station forms. The MME has an integrated form in which the RNC of the WCDMA network is integrated with a mobile service control node (MSC) for performing additional service processing and subscriber's call processing, and thus may perform the almost same functions of the RNC and the MSC.

In addition, the base station 200 may perform a handover procedure according to the above-described movement of the terminal 100. At this time, the base station 200 may support the handover procedure of the terminal 100 based on a specific handover protocol such as X2 handover or S1 handover. For example, the terminal 100 may continuously measure the strength of a signal transmitted from the base station 200 disposed within a certain range thereof in a mobile environment. Then, the terminal 100 may transmit the measured signal strength of a cell to the currently connected base station, for example, the base station A, through a measurement report message. Then, the base station A determines a target base station, based on the signal strength of the cell received from the terminal 100 and a neighbor cell list stored therein, and transmits a handover required message to the target base station, for example, the base station B. By doing so, the base station A enables the terminal 100 to release the connection with the base station A and newly connect to the base station B.

Meanwhile, in case of the S1 handover procedure, the base station A transmits the measurement report message, received from the terminal 100, to an EPC apparatus (not shown) of the core network 500, and the EPC apparatus determines the target base station.

As such, the terminal 100 and the base station 200 can continuously perform a process of cell connection or cell connection release in consideration of a moving environment of the terminal 100. In addition, the terminal 100 can identify the base station 200 as a moving target by using various handover messages generated in this process, determine a cell congestion degree of the target base station 200 by using a message previously received from the streaming server 400, and then request the streaming server 400 to change a service quality based on the cell congestion degree.

The streaming server 400 performs a function of providing various types of contents such as photo, video, audio, applications, etc. in a streaming manner to the terminal 100. For this, the streaming server 400 may receive at least one content from a content provider (CP) and manage the received content. For example, the streaming server 400 may control a process of receiving specific content such as a professional baseball broadcast, a world cup broadcast, etc. from a content providing server of the content provider, converting the received content into a streaming form, and managing the streaming content.

In particular, the streaming server 400 may encode the content and then store and manage the encoded content in the form of chunks divided by a predetermined length. At this time, the streaming server 400 may construct a data packet in accordance with an MPEG media transport (MMT) protocol, and transmit the MMT data packet to the terminal 100 in response to a request of the terminal 100.

In addition, the streaming server 400 may store cell information about the network environment of the base station 200 previously received from the cell management server 300. In this state, when a request for transmission of streaming data is received from the terminal, the streaming server 400 may transmit a cell congestion information message regarding the network environment of the base 200 to the terminal 100, and check in advance the network environment in which the terminal 100 is expected to move. If the network environment is congested, the streaming server 400 may encode the streaming data with a lowered service quality in advance, thereby minimizing the deterioration of the image quality that may occur when the terminal 100 moves to the corresponding cell.

The above process will be now described with reference to FIG. 2.

Figure 2:
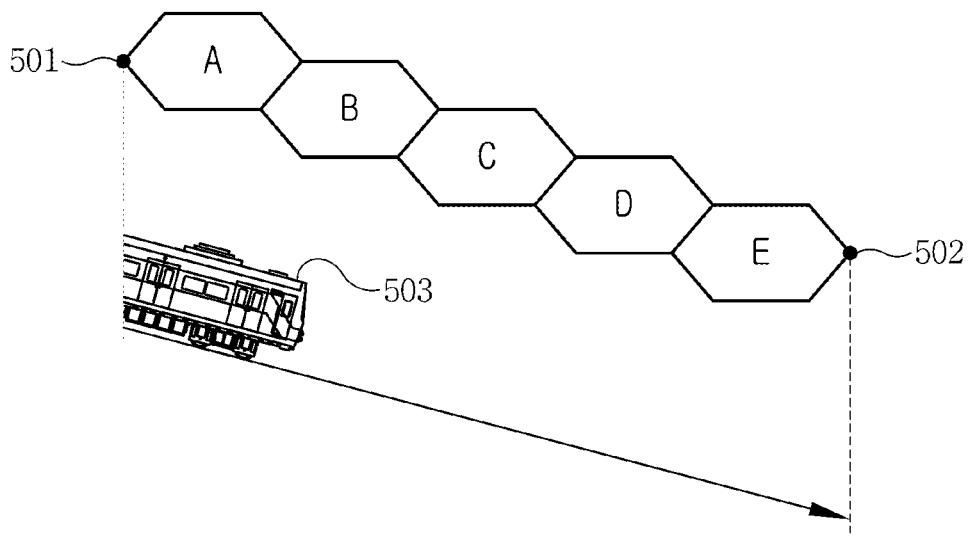
FIG. 2 is an exemplary diagram illustrating a streaming data transmission method according to an embodiment of the present invention.

FIG. 2 is an exemplary diagram illustrating a streaming data transmission method according to an embodiment of the present invention. It is assumed that the user having the terminal 100 is boarding a vehicle 503. Also, it is assumed that there are cells A, B, C, D and E to which the terminal 100 can be connected while moving. And also, it is assumed that the cells A, B, D and E are congested and the cell C is not congested. In this state, the user boarding the vehicle 503 may continuously move from a point 501 to a point 502. In case of transmitting streaming data encoded with a full high definition (FHD) level before the user boards the vehicle 503, the streaming server 400 encodes streaming data with a service quality lowered to a standard definition (SD) level and then transmits the lower-quality streaming data to the terminal 100 before the terminal 100 enters the cell A. In addition, because the cell C is not congested, the streaming server 400 encodes streaming data by raising the service quality to the FHD level and transmits the raised-quality streaming data to the terminal 100 before the entry into the cell C. Further, because the cells D and E are congested, the streaming server 400 encodes streaming data by lowering again the service quality before the entry into the cell D. It is therefore possible to minimize the influence of image qualities recognizable to the user and provide a seamless streaming service.

In addition, the terminal 100 may lower a service quality and receive streaming data when determining that a cell disposed in a direction of movement is congested. Then, when determining that the terminal 100 is out of the cell, the terminal 100 may request and receive streaming data corresponding to the original service quality.

A method for providing a streaming service will be described in detail later.

Meanwhile, the cell management server 300 may perform a function of storing and managing cell information transmitted by the plurality of base stations 200. In addition, the cell management server 300 may monitor and detect information transmitted and received between the terminal 100 and the base station 200. Also, the cell management server 300 may transmit, to the streaming server 400, the cell information and various kinds of information detected between the terminal 100 and the base station 200. Although the cell management server 300 is shown as a separate device independent of the streaming server 400, the invention is not limited thereto. Alternatively, the cell management server 300 and the streaming server 400 may be implemented in the form of a single apparatus.

Meanwhile, the core network 500 is a network system that performs main functions for mobile communication services such as mobility control and switching. Specifically, the core network 500 performs circuit switching or packet switching, and manages/controls a packet flow in the mobile network. In addition, the core network 500 may manage inter-frequency mobility, process traffic from/to the base station, and perform a function of interworking with other networks, e.g., Internet (not shown). The core network 500 may include a mobile switching center (MSC), a home location register (HLR), a mobile mobility entity (MME), a home subscriber server (HSS), and the like.

Processors installed respectively in the terminal 100, the base station 200, the cell management server 300, and the streaming server 400 may process program commands for executing a method according to the present invention. In one implementation, the processor may be a single-threaded processor. In another implementation, the processor may be a multithreaded processor. Further, the processor is capable of processing instructions stored in a memory or storage.

Hereinafter, a method for providing a streaming service according to an embodiment of the present invention will be described.

In order to transmit streaming data according to an embodiment of the present invention, the streaming server 400 should store cell information about the network environment of the base station 200 in advance.

A related process will be described with reference to FIG. 3.

Figure 3:
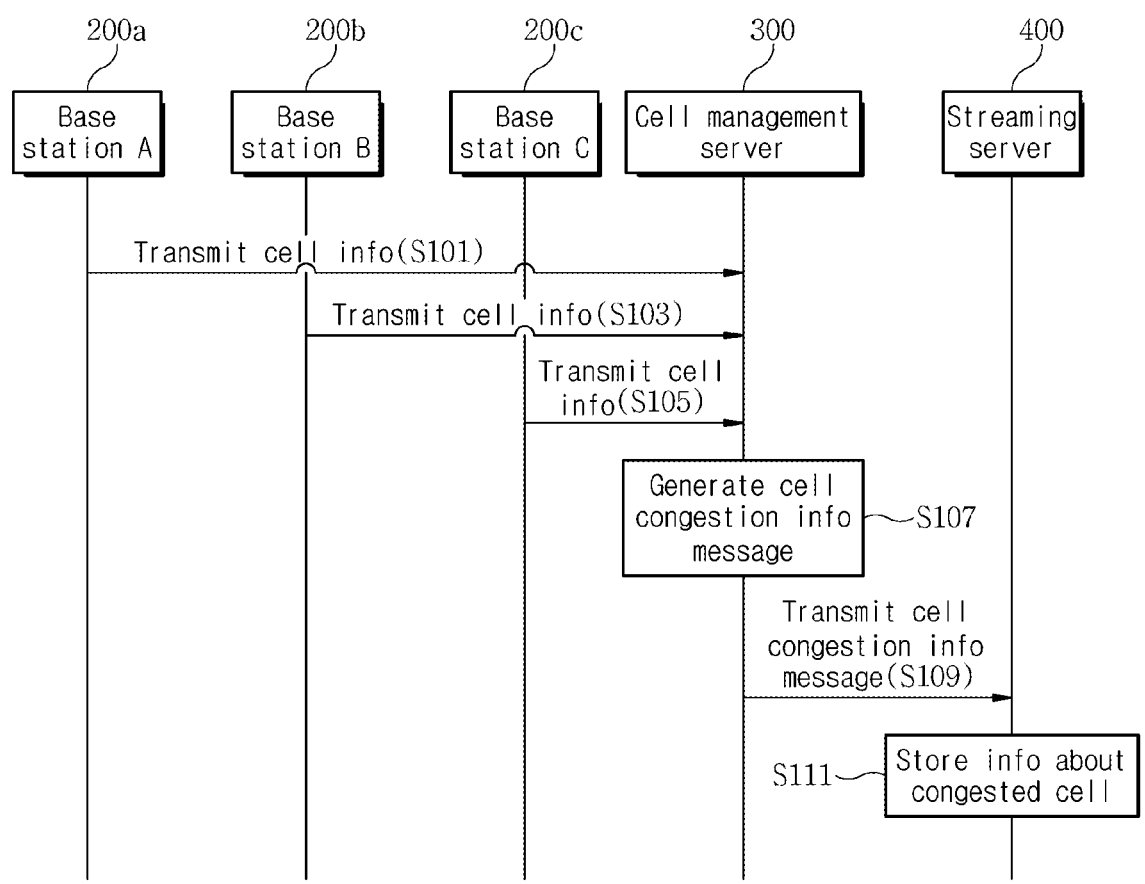
FIG. 3 is a data flow diagram illustrating a process of storing cell information for providing a streaming service according to an embodiment of the present invention.

FIG. 3 is a data flow diagram illustrating a process of storing cell information for providing a streaming service according to an embodiment of the present invention.

Referring to FIG. 3, a plurality of base stations 200a, 200b, and 200c transmit cell information to the cell management server 300 periodically or in real time. The cell information may contain identification information of a base station, congestion information of a cell, and information about neighboring cells. The cell congestion information may mean, for example, but not limited to, the number of connected terminals 100. Based on various kinds of information, the cell congestion information may be defined and identified.

The neighboring cell information may be identified through a neighboring cell list stored in the base station 200 or through measurement report messages collected from the terminal 100. In this disclosure, a neighboring cell may mean the base station 200 located at a physically close distance, or mean the base station 200 having adjacent cell coverage. For example, the base station A 200a may be located at a geographically near position from the base station B 200b having small cell coverage and also located at a geographically distant position from the base station C 200c having large cell coverage. In this case, when the cell coverage of the base station C 200c is more adjacent to the base station A 200a, the base station A 200a may determine that the base station C 200c is a neighboring cell.

As such, each of the base stations 200a, 200b, and 200c may transmit cell information indicating a network environment of a cell to the cell management server 300 (S101 to S105). Although it is illustrated that each of the base stations 200a, 200b, and 200c sequentially transmits the cell information to the cell management server 300, these processes may be simultaneously performed. In addition, the cell information that can be collected by the cell management server 300 is not limited in number, and the cell information may be simultaneously collected from all the base stations.

The cell management server 300 may store the collected cell information and construct a cell information database (CID). In addition, the cell management server 300 may identify information about a congested cell by using the collected cell information, generate a cell congestion information message for the congested cell, based on cell identification information (S107), and transmit the generated cell congestion information message to the streaming server 400 (S109).

In an embodiment, the format of the cell congestion information (CCI) message generated by the cell management server 300 and transmitted to the streaming server 400 may be as shown in Table 1 below.

TABLE 1

| Syntax | Values | No. of bits | Mnemonic |
|---|---|---|---|
| CCI_message ( ) { | | | |
|   message_id | | 16 | uimsbf |
|   version | | 8 | uimsbf |
|   length | | 16 | uimsbf |
|   message_payload{ | | | |
|   num_cell_event | | | |
|     for (i=0;i<N;i++) { | | | |
|       C_ID | | 32 | uimsbf |
| Congestion_level | | 16 | uimsbf |
|     } | | | |
|   } | | | |
|   event_time | | 64 | uimsbf |
|   expire_time | | 64 | uimsbf |
|   } | | | |
| } | | | |

In the above message structure, C_ID indicates cell identification information. For example, it may include cell identification information such as cell global identifier (CGI) or E-UTRAN CGI (ECGI), and may be composed of 32 bits.

Congestion_level is a congestion level indicating the degree of congestion of a cell to be used for changing a quality according to the cell. For example, the congestion level may be expressed in the form of high, mid, and low, and is four bits.

Event_time is related to an event time of the cell congestion information message and is composed of 64 bits.

Expire_time is related to an expiration time of the cell congestion information message and is composed of 64 bits.

As such, the cell management server 300 may identify a congestion level by using the cell information collected from the plurality of base stations 200, generate the cell congestion information message including the congestion level, and transmit it to the streaming server 400 (S109). After expiring according to a value designated in the expiration time, the cell congestion information message may be generated again and transmitted. The streaming server 400 may store the received message and store/manage information about the congested cell (S111).

The above-described process in which the cell management server 300 generates the cell congestion information message and transmits it to the streaming server 400 may be merely one embodiment. Alternatively, any device capable of performing a function equivalent to the cell management server 300 may generate the cell congestion information message.

The cell congestion information message may contain cell congestion information transmitted/received between an MMT transmitting entity and an MMT receiving entity. In this case, the cell congestion information may be measured by the base station, a media aware network element (MANE), or any entity existing on the network other than the management server 300.

Also, in order to avoid media quality deterioration caused by the MMT transmitting entity, the cell congestion information message may contain information about a network entity capable of performing or applying a media aware delivery function and identification information about network status of the network entity. Such information may be used by the MANE managing QoS so as to report the MMT transmitting entity.

The cell congestion information message according to another embodiment of the present invention may be defined as shown in Table 2 below.

TABLE 2

| Syntax | Values | No. of bits | Mnemonic |
|---|---|---|---|
| CCI_message ( ) { | | | |
|   message_id | | 16 | uimsbf |
|   version | | 8 | uimsbf |
|   length | | 16 | uimsbf |
|   message_payload{ | | | |
|     numberOflist | N1 | 8 | uimsbf |
|     for(i=0;i<N1;i++){ | | | |
|       mobile_info_descriptor( ) | | | |
|       levelOfnetworkstatus | | 4 | uimsbf |
|       reserved | '1111' | 4 | uimsbf |
|     } | | | |
|   reportingTime | | 32 | uimsbf |
|   validDuration | | 32 | uimsbf |
|   } | | | |
| } | | | |

Parameters applied to the cell congestion information message according to another embodiment of the present invention are shown in Table 3 below.

TABLE 3

| Parameter | Description |
|---|---|
| message_id | It indicates the identifier of the CCI message. |
| version | It indicates version of the CCI messages. An MMT sending entity can use this field to check the version of the received CCI message. |
| length | It indicates length of the CCI messages in bytes, counting from the first byte of the next field to the last byte of the CCI message. The value '0' is not valid for this field. |
| numberOflist | It specifies the number of list contained in mobile_info_descriptor. This field shall not be set to '0'. |
| mobile_info_descriptor | Mobile information descriptor contains information which is associated with MMT receiving entity in case it is a mobile device. When MMT receiving entity is a cellular mobile device, it can have mobile-specific attributes including MSISDN or Cell ID which are also defined in 3GPP. |
| levelOfnetworkstatus | It indicates the level of the network status which classifies the conditions of the underlying network in MANE. |
| reportingTime | It is reporting time of current network status which is based on NTP timestamp. The reportingTime is expressed in milliseconds. |
| validDuration | It indicates the valid period of this reporting information from the reportingTime in milliseconds. The value of this parameter within this CCI message is vaild until this duration. |

The cell congestion information message according to another embodiment of the present invention defines a mobile information descriptor (mobile_info_descriptor).

Specifically, the mobile information descriptor (mobile_infor_descriptor) may contain MMT receiving entity information and cell identification information when the MMT receiving entity is a mobile device. For example, when the MMT receiving entity is a cellular mobile device, the mobile information descriptor (mobile_infor_descriptor) may have mobile identification information including an MSISDN or cell ID defined in 2GPP.

Such a mobile information descriptor may be defined as follows.

TABLE 4

| Syntax | Values | No. of bits | Mnemonic |
|---|---|---|---|
| mobile_info_descriptor( ) { | | | |
| descriptor_tag | '0x0004' | 16 | uimsbf |
| descriptor_length | | 16 | uimsbf |
| MSISDN_flag | | 1 | boolean |
| IMSI_flag | | 1 | boolean |
| current_cell_id_flag | | 1 | boolean |
| reserved | | 5 | uimsbf |
| if(MSISDN_flag == 1){ | '1 1111' | | |
| MSISDN | | 60 | uimsbf |
| reserved | | 4 | uimsbf |
| } | '1111' | | |
| if(IMSI_flag == 1){ | | | |
| IMSI | | 60 | uimsbf |
| reserved | | 4 | uimsbf |
| } | | | |
| if(current_cell_id_flag == 1){ | '1111' | | |
| current_cell_id | | 60 | uimsbf |
| reserved | | 4 | uimsbf |
| } | | | |
| } | | | |

Parameters defined in the mobile information descriptor of the present invention are shown in Table 5 below.

TABLE 5

| Parameter | Description |
|---|---|
| descriptor_tag | A tag value indicates the type of this descriptor. The value of this field is 0x0004 in Table 63. |
| descriptor_length | It indicates the length in bytes counting from the next byte after this field to the last byte of the descriptor. |
| MSISDN_flag | It indicates whether MSISDN is included or not. If it is set to '1', the descriptor is included. |
| IMSI_flag | It indicates whether IMSI is included or not. If it is set to '1', the descriptor is included. |
| current_cell_id_flag | It indicates whether current_cell_ID is included or not. If it is set to '1', the descriptor is included. |
| MSISDN | It indicates MSISDN (Mobile Subscriber International Subscriber Directory Number) number of MMT receiving entity, and it follows format as defined in ITU-T specification E.164. The length of this field is 15 decimal digits, which is coded into 60 binary digits where each decimal digit is assigned 4 binary bits. |
| IMSI | It indicates IMSI (International Mobile Subscriber Identity) number of MMT receiving entity, and it follows format as defined in 3GPP TS 23.003. The length of this field is 15 decimal digits, which is coded into 60 binary digits where each decimal digit is assigned 4 binary bits. |
| current_cell_id | It indicates current cell ID (CGI for 2G/3G and eCGI for 4G) as defined in 3GPP TS 36.331. It is assigned a 15 decimal digit code which corresponds to totally 60 bits where 4 bits are assigned for each 1 decimal digit. |

The mobile information descriptor of the present invention may contain identification information (MSISDN, IMSI) of the terminal or the MMT entity or may contain cell identification information (current_cell_id), and each identification information may be included or not through flag setting. In addition, the cell identification information (current_cell_id) included in the mobile information descriptor of the present invention may include cell identification information about any one cell currently connected or available to the terminal or the MMT entity, or may include cell identification information about all cells or a plurality of selected specific cells.

In addition, the cell congestion information message according to another embodiment of the present invention contains network level information (levelOfnetworkstatus) as shown in Table 2. The network level information (levelOfnetworkstatus) means a congestion level indicating the degree of congestion of a connected cell to be used for changing the quality according to the cell. For example, the congestion level may be expressed in the form of high, mid, and low. Such network level information may be composed of 4 bits.

In addition, reportingTime relates to the time at which the cell congestion information message is reported, and may be composed of 32 bits.

Also, validDuration indicates a validity duration of the cell congestion information message, and may be composed of 32 bits.

As described above, the cell congestion information message according to another embodiment of the present invention may be generated by the cell management server 300, or generated by the base station, the media aware network element (MANE), or any entity existing on the network. When the cell congestion information message contains the mobile information descriptor (mobile_info_descriptor) that defines a network entity (terminal or MMT entity) capable of performing or applying a media aware delivery function and identification information (cell identification information) about network status of the network entity, it is possible to more accurately identify the MMT entity and more specifically apply the cell congestion information message to MMT communication.

Meanwhile, although in the above-described embodiment of the present invention the cell management server 300, which is separately constructed, receives information from the base station 200 and selects/processes the received information, the invention is not limited thereto. When the cell management server 300 and the streaming server 400 are implemented as a single device, the streaming server 400 may directly receive cell information from the plurality of base stations 200. In this case, the cell information may be received from the base stations 200a, 200b and 200c in the form of the cell congestion information message, and then stored in correspondence with identification information of the base station 200. Also, a rank may be designated, based on the cell information, and only a cell having a given rank or higher may be determined as a congested cell.

Hereinafter, a method for providing streaming data according to the present invention will be described with reference to FIG. 4 to FIG. 13.

Figure 4:
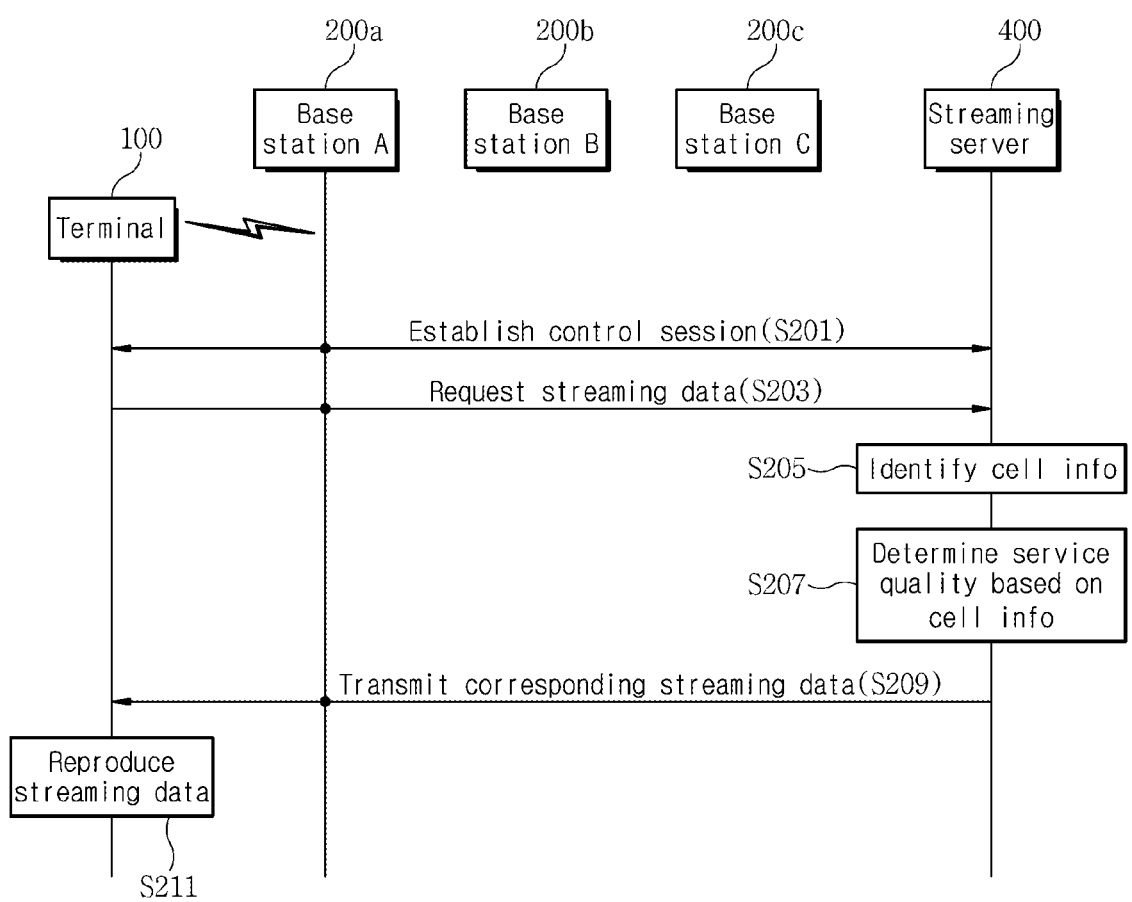
FIGS. 4 and 5 are data flow diagrams illustrating a streaming data providing method according to an embodiment of the present invention.
Figure 5:
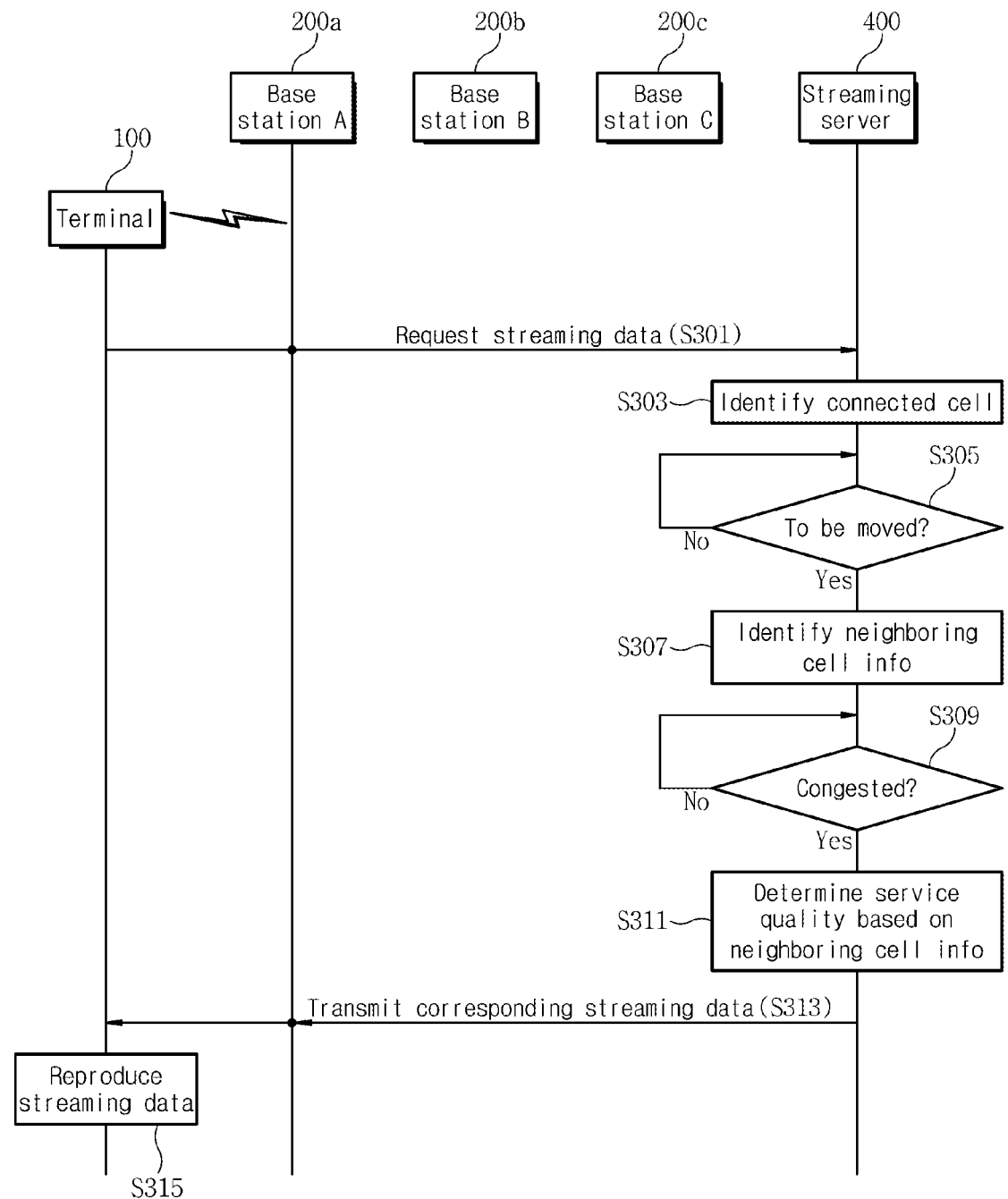

FIGS. 4 and 5 are data flow diagrams illustrating a streaming data providing method according to an embodiment of the present invention.

Referring to FIG. 4, it is assumed that the terminal 100 is in a state of being connected to the base station A 200a. A connection procedure between the terminal 100 and the base station A 200a is well known in the art, so that the description thereof will be omitted.

In this state, the terminal 100 may establish a control session with the streaming server 400 through the connected base station A 200a (S201). The control session may be established according to a transmission control protocol (TCP) communication procedure, but the invention is not limited thereto.

Then, the terminal 100 sends a request for streaming data to the streaming server 400 through the control session (S203). At this time, the terminal 100 may transmit cell identification information of the base station A 200a, which is a connected cell, to the streaming server 400. Then, the streaming server 400 may recognize the connected cell, to which the terminal 100 is currently connected, by using the cell identification information of the base station A 200a, and may also identify a congestion level of the connected cell by using a cell congestion information message which has been already stored.

At this time, if information about all cells is stored, the streaming server 400 may check the stored cell information by using the cell identification information of the base station A 200a and thereby determine whether a network environment of the base station A 200a is in a congested state or not. Also, if only cell information having a congestion level equal to or higher than a predetermined level is stored, and if the cell information corresponding to the identification information of the base station A 200a is not stored, the streaming server 400 may determine that the connected cell of the terminal 100 is not in a congested state.

When information about the network environment is identified through the above process, the streaming server 400 may determine a service quality according to the corresponding information, and sequentially transmit streaming data encoded with the determined service quality to the terminal 100 (S209). Then, the terminal 100 sequentially receives and reproduces the received data (S211).

Meanwhile, at step S205, the streaming server 400 may perform a process of identifying cell information of a target cell to which the terminal 100 will be moved, not the currently connected cell, considering a mobile environment of the terminal 100.

The above process is shown in FIG. 5. First, in a state of being connected to the base station A 200a, the terminal 100 may send a request for streaming data to the streaming server 400 through a control session (S301). Because this request contains identification information of the base station A 200a, the streaming server 400 identifies a connected cell corresponding to the cell identification information of the base station A 200a. In addition, the streaming server 400 checks a possibility of movement of the terminal 100.

At this time, the streaming server 400 may collect various kinds of sensor information from the terminal 100 and, based on the collected sensor information, check whether the terminal 100 is moving or not, and, if so, information about a moving direction. For example, the streaming server 400 may receive the sensor information including acceleration information and GPS information from the terminal 100 and then recognize that the terminal 100 is moving at a speed of 50 km in the north direction.

Meanwhile, the streaming server 400 may identify the mobility of the terminal 100 by using messages related to various handover procedures between the terminal 100 and the base station A 200a. That is, as described above, the terminal 100 may periodically transmit, to the connected base station A 200a, a measurement report message indicating the strength of a received signal for a neighboring cell, and the base station A 200a may determine, by using the measurement report message received from the terminal 100, whether to perform a handover. In addition, the base station A 200a may interwork with the core network or directly determine a target base station. The streaming server 400 receives messages generated in the above process through the cell management server 300 or directly check such messages through monitoring. In addition, the streaming server 400 may collect messages related to the handover procedure from the terminal 100 and then identify a neighboring cell of a currently connected cell by using pre-stored cell information or identify a neighboring cell by checking a target base station in the messages related to the handover procedure.

Also, the streaming server 400 may collect the cell information from the terminal 100 in real time or periodically and thereby detect the mobility of the terminal 100.

Also, the streaming server 400 may check the mobility of the terminal 100 through a past movement history of the terminal 100 of the user or other user's terminal. For example, if the user of the terminal 100 has taken a subway at a point A and has gotten off at a point B, the streaming server 400 may predict a moving direction of the terminal 100, based on such a movement history. The movement history may include a movement history of the user's terminal 100 and movement histories of other users' terminals, which may be collectively considered. For example, in case of movement of the user using public transportation, the movement is made along a designated path. Therefore, based on such movement histories, the streaming server 400 may determine whether the terminal 100 is moving or not, and, if so, information about a moving direction.

In addition, the above process of checking the mobility may be performed in consideration of a specific condition. For example, in case of using sensor information to check the mobility, the terminal 100 may determine the mobility based on the sensor information detected by one or more sensors and then notify the mobility to the streaming server 400, or may transmit the sensor information to the streaming server 400 so that the streaming server 400 may determine the mobility. Also, in case of using a message related to the handover procedure, the streaming server 400 may determine the mobility of the terminal 100 when the message which contains identification information (e.g., eNBID, PCID, etc.) of the base station and is delivered to the base station by the terminal 100 is generated.

Also, the streaming server 400 may check the mobility by simultaneously considering various conditions. For example, when the message containing the identification information of the base station 200 is generated in a cell connection process of the terminal 100, the streaming server 400 may collect the sensor information of the terminal 100 and determine the mobility of the terminal 100.

When it is determined through the above-described process that the terminal 100 is to be moved, the streaming server 400 may identify a neighboring cell, e.g., the base station B 200b, of the currently connected cell through pre-stored cell information (S307). Then, by using the pre-stored cell information, the streaming server 400 may determine whether the neighboring cell is congested or not congested (S309). That is, the streaming server 400 may identify the base station B 200b as a neighboring cell by using the pre-stored cell information corresponding to the base station A 200a and then, by using the cell information of the base station B 200b through identification information of the base station B 200b, determine whether the neighboring cell is congested or not.

Thereafter, the streaming server 400 determines a service quality according to congestion information of the neighboring cell (S311), and transmits streaming data corresponding to the determined service quality (S313). In addition, when the neighboring cell is not congested, the streaming server 400 may maintain the original service quality at the step S311.

At the step S313, the terminal 100 sequentially receives the streaming data from the streaming server 400. Therefore, the terminal 100 can reproduce the streaming data seamlessly so that the user does not perceive the degradation of the image quality (S315).

The above description based on FIGS. 4 and 5 relates to the streaming data providing method in which the streaming server 400 adaptively changes the service quality in consideration of the mobility of the terminal 100 and transmits the streaming data according to the changed service quality.

Meanwhile, in the streaming data providing method of the present invention, the terminal 100 may adaptively change the service quality in consideration of a mobile environment thereof, request the provision of streaming data, and receive the streaming data with the changed service quality.

This will be described with reference to FIGS. 6 and 7.

Figure 6:
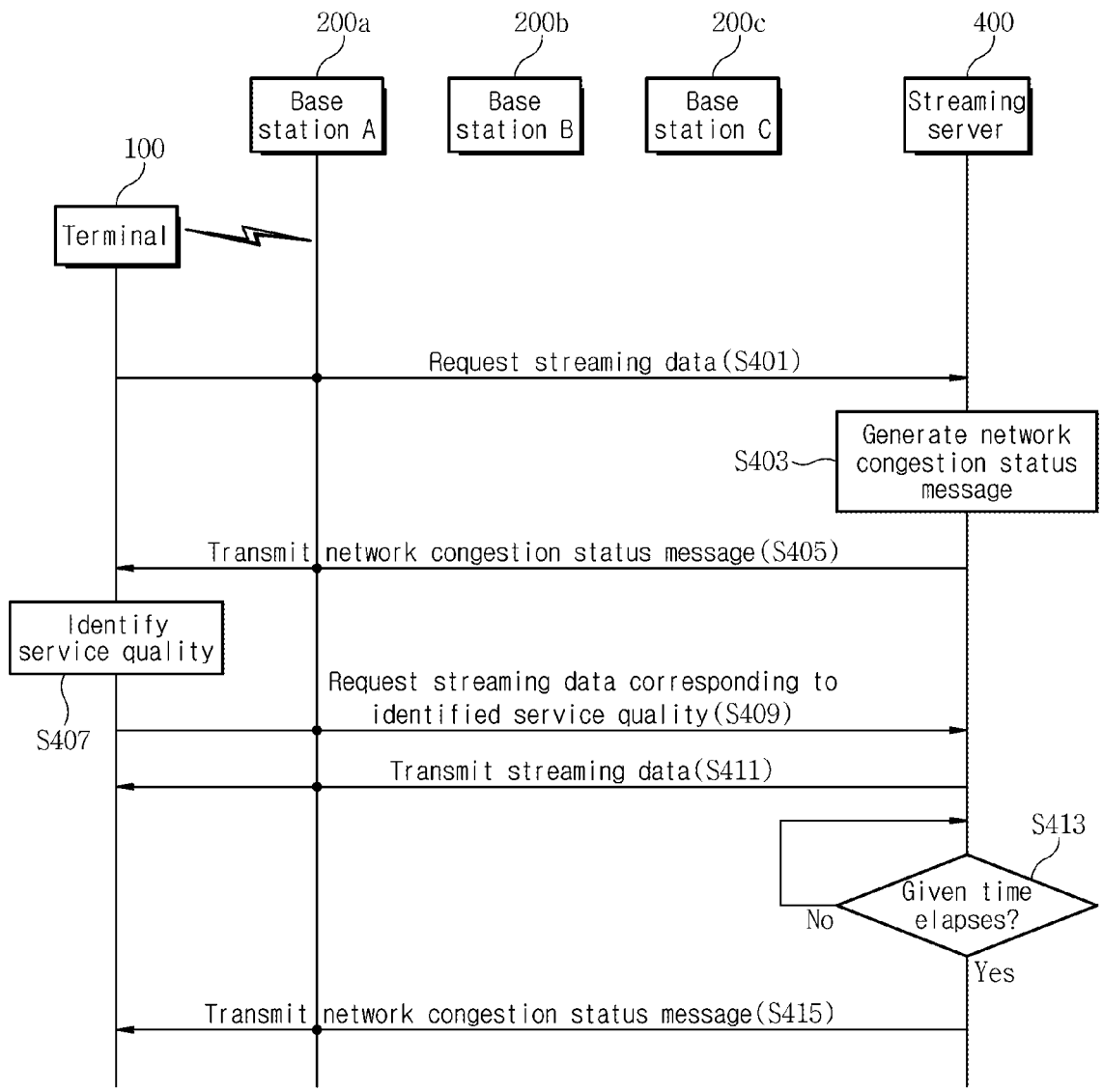
FIGS. 6 and 7 are data flow diagrams illustrating a streaming data providing method according to another embodiment of the present invention.
Figure 7:
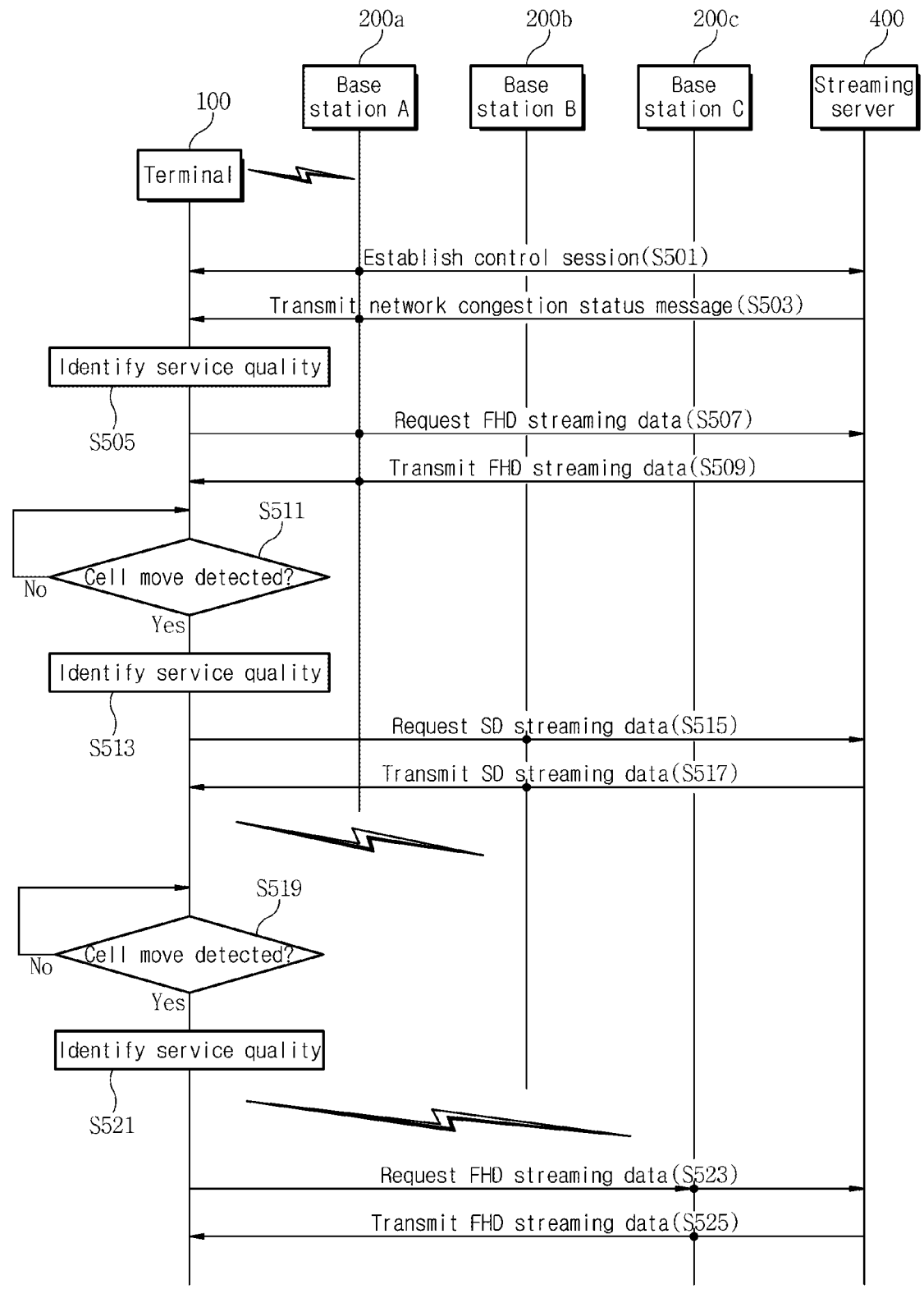

FIGS. 6 and 7 are data flow diagrams illustrating a streaming data providing method according to another embodiment of the present invention.

Referring to FIG. 6, it is assumed that the terminal 100 is in a state of being connected to the base station A 200a. A connection procedure between the terminal 100 and the base station A 200a is well known in the art, so that the description thereof will be omitted.

In this state, the terminal 100 may establish a control session with the streaming server 400 through the connected base station A 200a, and sends a request for streaming data to the streaming server 400 through the control session (S401). At this time, the terminal 100 may transmit cell identification information of the base station A 200a, which is a connected cell, to the streaming server 400.

In addition, the streaming server 400 generates a network congestion status message (S403). The network congestion status (NCS) message is configured to apply a media quality (e.g., resolution, FPS) of an MMT receiving entity in a specific cell. That is, the NCS message may be defined to contain a resolution and frames per second (FPS) which are recommended for adaptive streaming in a congested cell.

Also, the streaming server 400 may generate the network congestion status message corresponding to a cell identified through cell identification information contained in the streaming data request message received from the terminal 100 and then transmit the generated network congestion status message to the terminal 100. Alternatively, the terminal 100 may generate the network congestion status message that contains information about a neighboring cell other than the currently connected cell.

In an embodiment, the message format of the network congestion status message may be as follows.

TABLE 6

| Syntax | Values | No. of bits | Mnemonic |
| --- | --- | --- | --- |
| NCS _message ( ) { | | | |
|   message_id | | 16 | uimsbf |
|   version | | 8 | uimsbf |
|   length | | 16 | uimsbf |
|   message_payload{ | | | |
|     num_cell_event | | | |
|     for (i=0;i<N;i++) { | | | |
|       C_ID | | 32 | uimsbf |
| | | 4 | uimsbf |
| Forced_resolution | | 4 | uimsbf |
|       Forced_fps | | | |
|     } | | | |
|   } | | 16 | uimsbf |
|   expire_time | | 8 | uimsbf |
|   subscription_type | | 16 | uimsbf |
|   app_ID | | 16 | uimsbf |
|   channel_List | | | |
|     } | | | |
| } | | | |

In the above message format of Table 6, C_ID indicates cell identification information. For example, it may include cell identification information such as cell global identifier (CGI) or E-UTRAN CGI (ECGI), and may be composed of 32 bits.

Forced_resolution indicates a resolution according to a service quality that can be set corresponding to a congested cell, and this may vary depending on LD, SD, and HD levels. This resolution (Forced_resolution) may be composed of 4 bits.

Forced_fps indicates the number of frames per second according to a service quality that can be set corresponding to a congested cell, and the fps value may vary depending on the service quality, such as 10, 15, and 20. This fps (Forced_fps) may be composed of 4 bits.

Subscription type indicates information about a subscriber type. For example, it may mean a premium type or a normal type which is identified on the basis of service subscription information of the terminal 100. Depending on the subscriber type, the service quality may vary. If the subscription type field indicates 0xFF hexadecimal, it means that all subscribers can be targeted. The subscriber type field may be composed of 8 bits.

App_ID indicates identification information of an application in which a streaming data request is generated in the terminal 100. This application may be YouTube, Facebook, or the like for receiving streaming data. The application ID may be composed of 16 bits. Also, channel_List indicates a list of channels of a media service that requests streaming data, and may be composed of 16 bits. Depending on the app_ID and the channel_List, the service quality may vary.

As described above, the network congestion status message according to an embodiment of the present invention may be configured to include the service quality (resolution and fps) corresponding to the cell identification information.

When the generation of the network congestion status message is completed, the streaming server 400 transmits it to the terminal 100 (S405). Then, the terminal 100 identifies a service quality (resolution and fps) of a current cell through the network congestion status message (S407).

In addition, the terminal 100 requests streaming data corresponding to the identified service quality (S409), and the streaming server 400 transmits the streaming data, requested by the terminal 100, according to the service quality (S411).

Meanwhile, when a predetermined time elapses after a session connection with the terminal 100 (S413), the streaming server 400 reconfigures the network congestion status message and transmits the reconfigured network congestion status message to the terminal 100 (S415).

In addition, even in an environment where the terminal 100 moves, the terminal 100 is capable of using an adaptive streaming service through the network congestion status message received from the streaming server 400.

This will be described with reference to FIG. 7. First, in a state of being connected to the base station A 200*a*, the terminal 100 may send a request for streaming data to the streaming server 400 through a control session (S501). Because this request contains identification information of the base station A 200*a*, the streaming server 400 identifies a connected cell corresponding to the cell identification information of the base station A 200*a*, generates a network congestion status message containing information about the connected cell, and transmits it to the terminal 100 (S503).

Then, the terminal 100 identifies a cell congestion level of the currently connected base station 200*a* through the network congestion status message and also identifies the corresponding service quality (S505). For example, if it is possible to use an FHD level in the coverage of the base station 200*a*, the terminal 100 requests and receives FHD-level streaming data from the streaming server 400 (S507 to S509).

In addition, the terminal 100 may detect cell movement while sequentially receiving and reproducing the FHD-level streaming data (S511).

At this time, the terminal 100 may collect various kinds of sensor information through various sensors thereof and, based on the collected sensor information, check whether the terminal 100 is moving or not, and, if so, information about a moving direction. For example, the terminal 100 may receive the sensor information including acceleration information and GPS information and then recognize the movement thereof at a speed of 50 km in the north direction.

Meanwhile, the terminal 100 may identify the mobility thereof by using messages related to various handover procedures with the base station A 200*a*. That is, as described above, the terminal 100 may periodically transmit, to the connected base station A 200*a*, a measurement report message indicating the strength of a received signal for a neighboring cell, and the base station A 200*a* may determine, by using the measurement report message received from the terminal 100, whether to perform a handover. In addition, the base station A 200*a* may interwork with the core network or directly determine a target base station, and may identify in advance, through various messages generated in such a process, a target cell to which the terminal 100 will move.

Also, the terminal 100 may check the mobility thereof through a past movement history. For example, if the user of the terminal 100 has taken a subway at a point A and has gotten off at a point B, the terminal 100 may predict a moving direction thereof, based on such a movement history. The movement history may include a movement history of the user's terminal 100 and movement histories of other users' terminals, which may be collectively considered. For example, in case of movement of the user using public transportation, the movement is made along a designated path. Therefore, based on such movement histories, the terminal 100 may determine whether the terminal 100 is moving or not, and, if so, information about a moving direction.

In addition, the above process of checking the mobility may be performed in consideration of a specific condition. For example, in case of using sensor information to check the mobility, the terminal 100 may determine the mobility based on the sensor information detected by one or more sensors.

Also, in case of using a message related to the handover procedure, the terminal 100 may determine the mobility thereof when the message which contains identification information (e.g., eNBID, PCID, etc.) of the base station and is delivered to the base station by the terminal 100 is generated.

When it is determined through the above-described process that the terminal 100 is to be moved, the terminal 100 may identify a congestion level of a cell, e.g., the base station B 200*b*, located in the moving direction by using the network congestion status message received from the streaming server 400, and may also identify a service quality according to the congestion level (S513).

For example, if the base station B 200*b* is in a congested state, and if the terminal 100 enters the corresponding cell without lowering a service quality in advance, a phenomenon such as a disconnection of a streaming service may occur. Therefore, the terminal 100 requests in advance streaming data having a service quality, e.g., SD level, corresponding to the base station B 200*b* before the cell movement is completed (S515), and then receives the SD-level streaming data from the streaming server 400 (S517).

Through this process, the terminal 100 is in a state of being receiving the streaming data with a service quality lowered in advance before the cell movement. Therefore, when the actual cell movement occurs, it is possible to minimize problems that may be caused in a congested situation, such as a delay in receiving the streaming data.

Meanwhile, the terminal 100 may perform cell movement from the base station B 200*b* to the base station C 200*c*. When the cell movement is detected (S519) as described above, the terminal 100 may identify in advance a service quality of a target cell of movement. If it is determined that a congestion level of the target neighboring cell is higher than that of the currently connected cell, the terminal 100 requests in advance streaming data having a service quality, e.g., FHD level, suitable for the corresponding cell before the cell movement is completed (S523), and then receives the FHD-level streaming data from the streaming server 400 (S525).

As described above, the terminal 100 may receive the network congestion status message indicating the network congestion information corresponding to the target cell from the streaming server 400 and, based on the received message, identify in advance the congestion status of the target cell of movement. Then, if it is determined that the target cell is congested, the terminal 100 may receive the streaming data with a lowered service quality suitable for the target cell before the movement is completed. Therefore, when the cell movement is completed, it is possible to minimize the deterioration of the image quality.

In addition, according to still another embodiment of the present invention, the streaming server 400 may transmit streaming data of a service quality corresponding to the maximum bitrate in response to a request of the terminal 100 that detects the entry into a congestion cell.

This will be described hereinafter with reference to FIG. 8.

Figure 8:
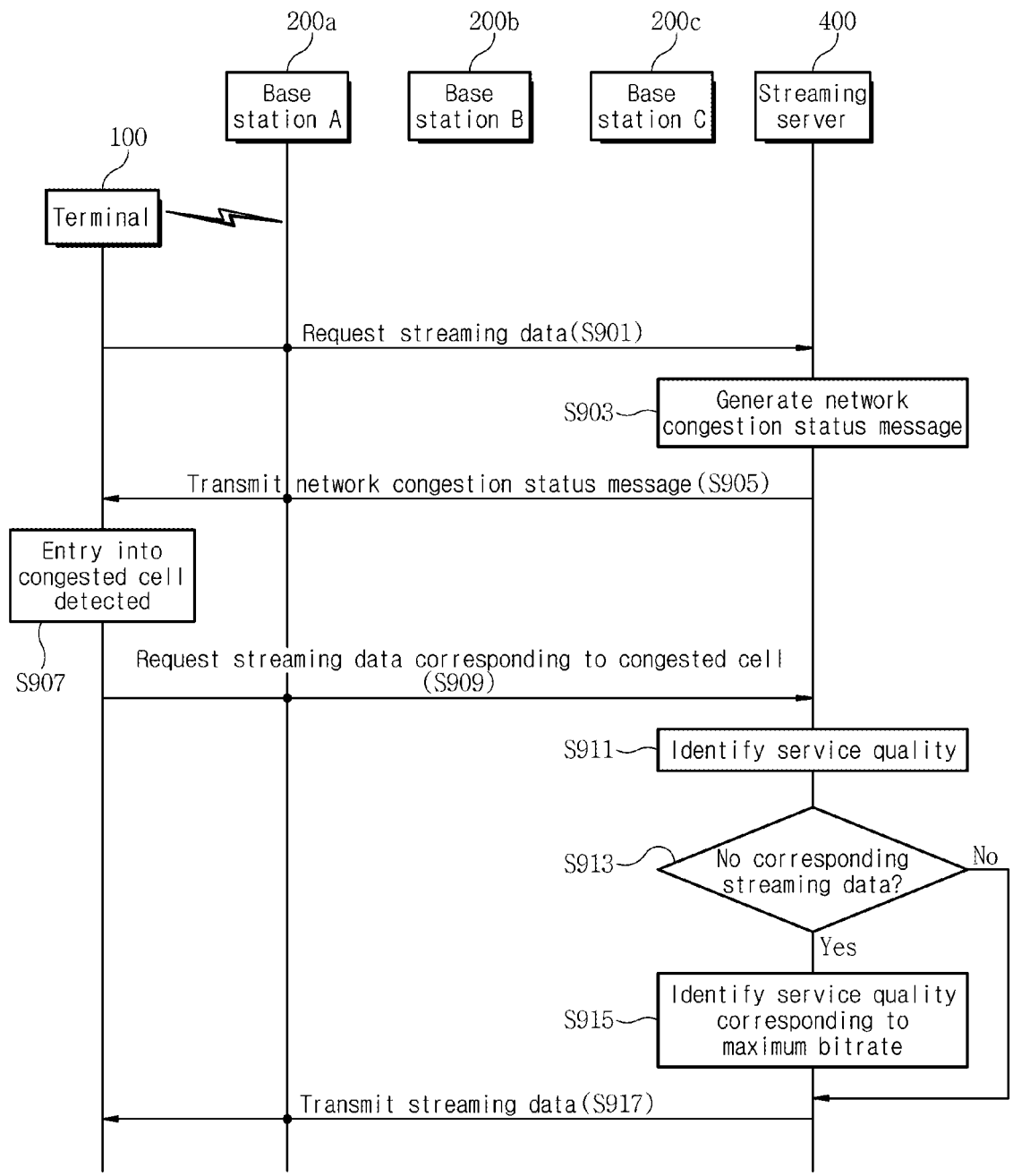
FIG. 8 is a data flow diagram illustrating a streaming data providing method according to still another embodiment of the present invention.

FIG. 8 is a data flow diagram illustrating a streaming data providing method according to still another embodiment of the present invention.

Referring to FIG. 8, it is assumed that the terminal 100 is in a state of being connected to the base station A 200a. A connection procedure between the terminal 100 and the base station A 200a is well known in the art, so that the description thereof will be omitted.

In this state, the terminal 100 may establish a control session with the streaming server 400 through the connected base station A 200a, and sends a request for streaming data to the streaming server 400 through the control session (S901). At this time, the terminal 100 may transmit cell identification information of the base station A 200a, which is a connected cell, to the streaming server 400.

In addition, the streaming server 400 generates a network congestion status message (S903). Contrary to the above-described network congestion status message, the network congestion status (NCS) message of this embodiment is configured to contain the maximum bitrate (Max_bitrate) for adaptive streaming in a congested cell.

Also, the streaming server 400 may generate the network congestion status message corresponding to a cell identified through cell identification information contained in the streaming data request message received from the terminal 100 and then transmit the generated network congestion status message to the terminal 100. Alternatively, the terminal 100 may generate the network congestion status message that contains information about a neighboring cell other than the currently connected cell. Alternatively, the terminal 100 may generate the network congestion status message that contains information about all cells other than the currently connected cell.

The message format of the network congestion status message according to this embodiment may be as follows.

TABLE 7

| Syntax | Values | No. of bits | Mnemonic |
|---|---|---|---|
| NCS_message ( ) { | | | |
|   message_id | | 16 | uimsbf |
|   version | | 8 | uimsbf |
|   length | | 16 | uimsbf |
|   message_payload{ | | | |
|   num_cell_event | | | |
|     for (i=0;i<N;i++) | | | |
|   { | | 32 | uimsbf |
|     C_ID | | 4 | uimsbf |
|     max_bit rate | | 4 | uimsbf |
|   } | | | |
|   } | | | |
|   expire_time | | 64 | uimsbf |
|   priority_type | | 8 | uimsbf |
|   private_field | | 32 | uimsbf |
| } | | | |
| } | | | |

In Table 7, C_ID indicates cell identification information. For example, it may include cell identification information such as cell global identifier (CGI) or E-UTRAN CGI (ECGI), and may be composed of 32 bits.

Max_bitrate means the maximum bitrate that indicates the maximum number of bits that can be processed per second according to a service quality. For example, the maximum bitrate may be 500 kbps for LD level, 1 Mbps for SD level, 2 Mbps for HD level, and 4 Mbps for FHD level. This may be composed of 4 bits.

Expire_time relates to an expiration time of a network congestion status message and is composed of 64 bits. The terminal 100 may check the expiration time and request again the network congestion status message, or the streaming server 400 may retransmit the network congestion status message to the terminal 100 by using the expiration time.

Priority_type indicates information about a subscriber type. For example, it may mean a premium type or a normal type which is identified on the basis of service subscription information of the terminal 100. Depending on the subscriber type, the service quality may vary. For example, even if the terminal 100 is expected to enter a congested cell, the streaming server 400 may provide high-quality streaming data to the terminal 100 without lowering a quality when the service subscription information of the terminal 100 indicates a premium-type service subscriber. If the subscription type (priority_type) field indicates 0xFF hexadecimal, it means that all subscribers can be targeted. The subscriber type field may be composed of 8 bits.

Private_field is any other private field and may contain, for example, an application ID, a channel list, and the like. This may be composed of 32 bits. The application ID indicates identification information of an application in which a streaming data request is generated in the terminal 100. This application may be YouTube, Facebook, or the like for receiving streaming data. The application ID may be composed of 16 bits. Also, the channel list indicates a list of channels of a media service that requests streaming data, and may be composed of 16 bits. Using information of the private field, the streaming server 400 may provide differential streaming data. For example, even if the terminal 100 enters the congested cell, the streaming server 400 may perform an exceptional process of providing a high-quality service without lowering a service quality when a predetermined condition is satisfied, for example, when an application requesting the streaming data is an important application or when a channel is an important channel.

Upon receiving the network congestion status message, the terminal 100 may identify a service quality corresponding to a neighboring cell in a moving direction, namely, the maximum bitrate, based on the for-syntax, and then request/receive streaming data from the streaming server 400 in accordance with the corresponding service quality, namely, the maximum bitrate. The operation according to the for-syntax may be performed until the expire_time.

As described heretofore, the network congestion status message according to still another embodiment of the present invention may be configured to contain the maximum bitrate corresponding to cell identification information. Using this, the streaming server 400 may identify a service quality corresponding to the maximum bitrate and then transmit streaming data of the identified service quality to the terminal 100 when there is no streaming data corresponding to a currently requested service quality.

That is, when the generation of the network congestion status message is completed, the streaming server 400 transmits the network congestion status message to the terminal 100 (S905). Then, the terminal 100 is capable of identifying the maximum bitrate corresponding to a congested cell through the network congestion status message.

In addition, as described above, the terminal 100 may detect movement thereof through various manners and identify the entry into a congested cell. Here, the terminal 100 may receive the network congestion status message corresponding to a target neighbor cell to which the terminal 100 is to move, and then identify through the received message whether the target neighboring cell is a congested cell. If only the network congestion status message corresponding to a congested cell is received from the streaming server 400, and if there is the network congestion status message corresponding to a neighboring cell, the terminal 100 may identify the neighboring cell as the congested cell.

In addition, when the movement to a congested cell is predicted (S907), the terminal 100 sends a request for streaming data corresponding to the congested cell to the streaming server 400. This request sent to the streaming server 400 may contain information about the maximum bitrate identified based on the cell identification information and the network congestion status message.

Then, the streaming server 400 identifies streaming data corresponding to a service quality (S911). If it is determined that there is no streaming data corresponding to the service quality (S913), the streaming server 400 identifies a service quality corresponding to the maximum bitrate (S915) and transmits streaming data corresponding to the maximum bitrate to the terminal 100.

This is for providing a streaming service more quickly according to the situation of the streaming server 400. For example, the streaming server 400 may or may not have streaming data encoded according to all service qualities. In case of failing to have some streaming data, it may take some time until the streaming server 400 encodes streaming data with a specific service quality requested by the terminal 100 and then transmits the encoded streaming data to the terminal 100. Therefore, in order to prevent a delay that may occur in such a situation, the streaming server 400 according to still another embodiment of the present invention may transmit streaming data of a service quality corresponding to the maximum bitrate to the terminal 100. For example, when the maximum bitrate requested by the terminal 100 is HD-level 2 Mbps, and when there is no already encoded streaming data corresponding to the HD level, the streaming server 400 may transmit, to the terminal 100, streaming data of SD-level 1 Mbps which is lower than the HD level.

In addition, the network congestion status message according to still another embodiment of the present invention may be configured in the following message format.

TABLE 8

| Syntax | Values | No. of bits | Mnemonic |
|---|---|---|---|
| NCS_message ( ) { | | | |
|   message_id | | 16 | uimsbf |
|   version | | 8 | uimsbf |
|   length | | 16 | uimsbf |
|   message_payload{ | | | |
|     numberOflist | | 8 | uimsbf |
|     for(i=0;i<N1;i++){ | | | |
|       mobile_info_descriptor( ) | | | |
|       maximum_rate | | 16 | uimsbf |
|     } | | | |
|     validDuration | | 32 | uimsbf |
|     private_length | | 16 | uimsbf |
|     for(j=0;j<N2;j++){ | | | |
|       private_byte | | 8 | uimsbf |
|     } | | | |
|   } | | | |
| } | | | |

Main parameters of the network congestion status message defined in Table 8 according to still another embodiment of the present invention are as follows.

TABLE 9

| Parameter | Description |
|---|---|
| message_id | It indicates the identifier of the NCS message. |
| version | It indicates version of the NCS messages. An MMT receiving entity can use this field to check the version of the received NCS message. |
| length | It indicates length of the NCS messages in bytes, counting from the first byte of the next field to the last byte of the NCS message. The value '0' is not valid for this field. |
| numberOflist | It specifies the number of mobile_info_descriptor. This field shall not be set to '0'. |
| mobile_info_descriptor | Mobile information descriptor contains information which is associated with MMT receiving entity in case it is a mobile device. When MMT receiving entity is a cellular mobile device, it can have mobile-specific attributes including MSISDN or Cell ID which are also defined in 3GPP. |
| maximum_rate | It defines maximum bitrate of available network condition which provides to prevent the network congestion during continuous delivery of the Package. The maximum_rate is the limited bitrate during validDuration. The maximum_rate is expressed in bits per second. |
| validDuration | It indicates the valid period of the NCS message. The NCS message is valid from the sending time of the received MMTP packet which current message is carried |

TABLE 9-continued

| Parameter | Description |
| --- | --- |
|  | on until this validDuration. The sending time is specified by the sending timestamp of MMTP packet header in milliseconds. The MMT receiving entity does not need to try to change its media quality. |
| private_length | the identifier is provided as private data and this field provides the length of the private identifier in bytes. |
| private_byte | a byte of the private identifier. |

A mobile information descriptor (mobile_info_descriptor) of the network congestion status message defined in still another embodiment of the present invention may be the same as that described with reference to Table 4 and Table 5.

However, contrary to the mobile information descriptor contained in the cell congestion status message transmitted to the streaming server 400, the mobile information descriptor of the network congestion status message transmitted to the terminal 100 by the streaming server 400 may be defined to contain information about a neighboring cell. Also, the network congestion status message may be defined to contain the maximum bitrate (maximum_rate) for a cell defined in the mobile information descriptor. The maximum bitrate (maximum_rate) means the maximum bitrate in the corresponding cell, that is, the maximum number of bits that can be processed per second in accordance with a service quality identified through the mobile information descriptor (mobile_info_descriptor). For example, the maximum bitrate may be 500 kbps for LD level, 1 Mbps for SD level, 2 Mbps for HD level, and 4 Mbps for FHD level. This may be composed of 16 bits.

In addition, the network congestion status message contains a valid duration (validDuration) and a private length (private-length). The validity duration (validDuration) relates to a validity period of the network congestion status message, and is composed of 32 bits. The terminal 100 may check the valid duration and request again the network congestion status message, or the streaming server 400 may retransmit the network congestion status message to the terminal 100 by using the valid duration.

The private length (private_length) indicates a private field, and may include information about a subscriber type, an application ID, a channel list, and the like.

Upon receiving the network congestion status message defined as described above, the terminal 100 identifies cell identification information through the mobile information descriptor (mobile_info_descriptor) as seen from the for-syntax, and then identifies a service quality corresponding to the identified cell identification information, that is, the maximum bitrate (maximum_rate).

As such, the terminal 100 may identify a service quality corresponding to a neighboring cell in a moving direction, namely, the maximum bitrate, through the for-syntax by using the network congestion status message described above, and then request/receive corresponding streaming data from the streaming server 400.

Up to now, the streaming service providing method according to embodiments of the present invention has been described.

Meanwhile, although it has been described in an embodiment of the present invention that the terminal 100 determines a service quality by considering congestion in a target neighboring cell of movement and then requests/receives streaming data from the streaming server 400, the invention is not limited thereto. For example, if a network environment is excellent in most cells and exceptionally congested only in specific cells, the terminal 100 receives streaming data with a lowered service quality when a target neighboring cell of movement is congested. Then, when it is determined that the terminal 100 gets out of the target cell, the terminal 100 may request and receive streaming data corresponding to the original service quality immediately without checking a service quality corresponding to the next cell.

Hereinafter, a main configuration and operations of each apparatus that supports the streaming service providing method according to embodiments of the present invention will be described.

Figure 9:
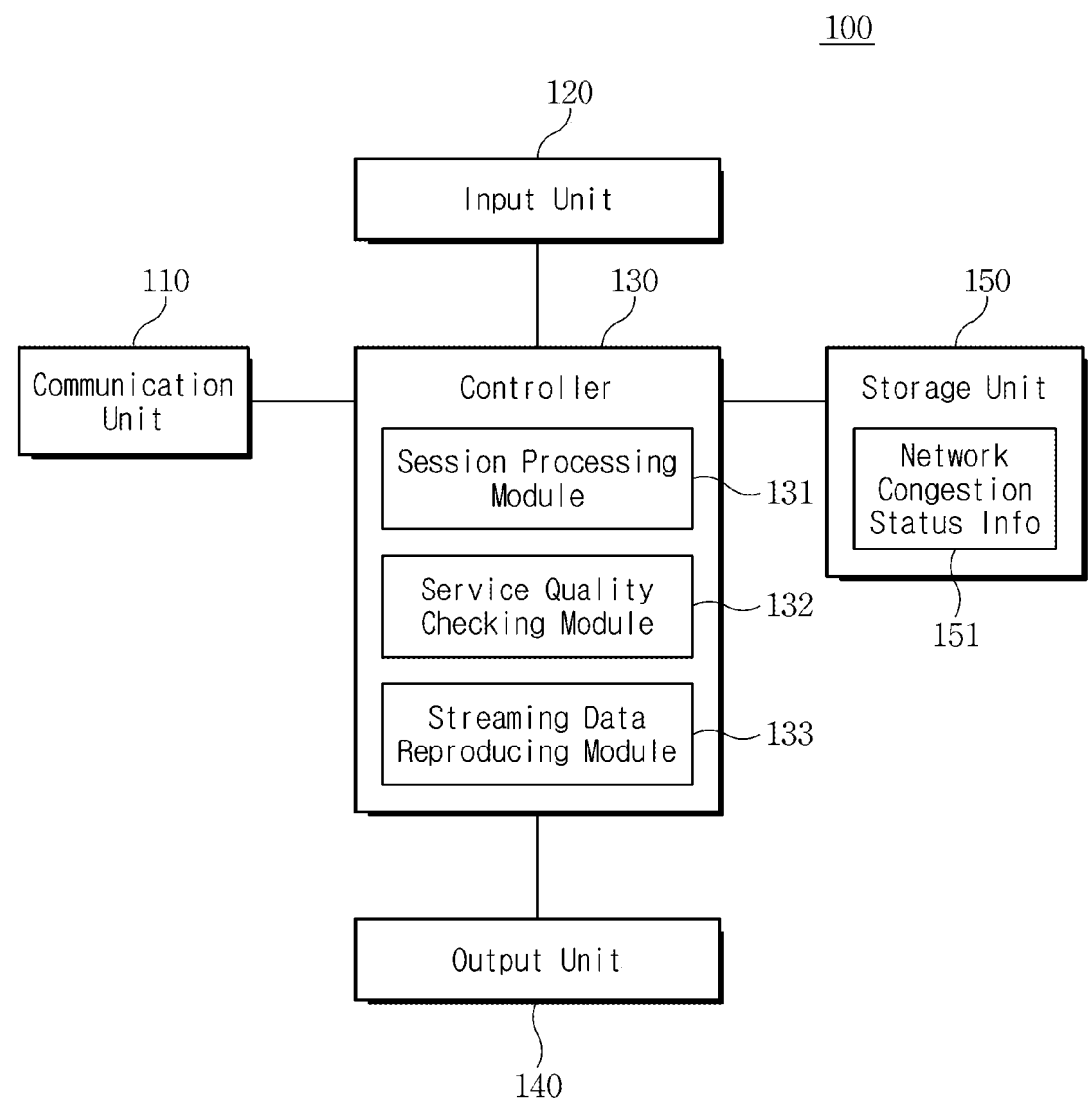
FIG. 9 is a block diagram illustrating a main configuration of a terminal according to an embodiment of the present invention.
Figure 10:
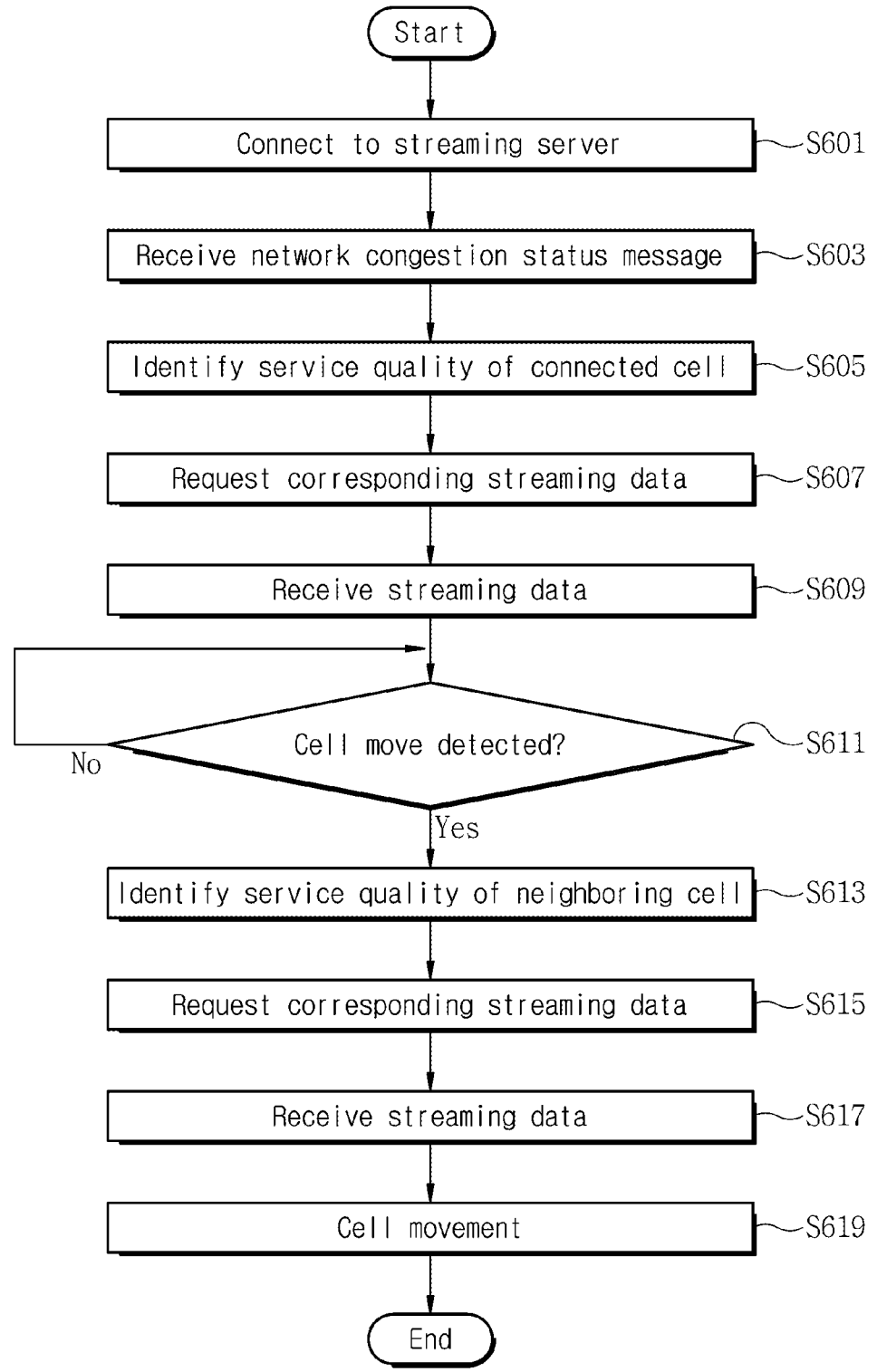
FIG. 10 is a flow diagram illustrating operations of a terminal according to an embodiment of the present invention.

FIG. 9 is a block diagram illustrating a main configuration of a terminal according to an embodiment of the present invention, and FIG. 10 is a flow diagram illustrating operations of a terminal according to an embodiment of the present invention.

Referring to FIG. 9, the terminal 100 according to an embodiment of the present invention may include a communication unit 110, an input unit 120, a controller 130, an output unit 140, and a storage unit 150.

The communication unit 110 may support a process of connecting to the base station 200 located within a certain range and a process of connecting to the core network 500 via the base station 200. The communication unit 110 may access the access network by supporting a process of discovering the base station 200 located within a certain range, requesting connection with the discovered base station 200, and establishing the connection with the base station 200. This process of connecting the communication unit 110 of the terminal 100 to the base station 200 in the access network is well known in the art, and thus a detailed description thereof will be omitted. In addition, the communication unit 110 may perform various communication procedures related to handover in a moving environment, and may perform a function of establishing a session with the streaming server 400 via the core network 500 and transmitting/receiving various kinds of information necessary to maintain the session.

In addition, the communication unit 110 may transmit a request for streaming data according to a service quality to the streaming server 400, receive the requested streaming data from the streaming server 400, and deliver the received streaming data to the controller 130.

The input unit 120 receives a user input for entering various kinds of information such as alphanumeric information, setting various functions, or controlling a function of the terminal 100, and delivers an input signal to the controller 130. In particular, the input unit 120 may receive a user input related to a request for streaming data transmission. For example, the input unit 120 may receive a user input of executing an application to receive streaming data, and may also receive a user input of selecting a specific channel through the application.

The controller 130 performs overall control of the terminal 100 and may include, as hardware, at least one processor including a central processing unit (CPU), at least one execution memory (e.g., a register and/or a random access memory (RAM)) on which data is loaded, and a bus for inputting/outputting data to/from the processor and the memory. In addition, the controller 130 may include, as software, predetermined program routines or program data that are loaded into the execution memory from a certain recording medium to perform a function defined in the terminal 100 and then processed by the processor. That is, according to embodiments of the invention, a specific function capable of being processed in software, among functions provided in the terminal 100 to perform processes of requesting and receiving streaming data from the streaming server 400 and then reproducing the received streaming data, may be regarded as a function of the controller 130.

According to an embodiment of the present invention, the controller 130 may include a session processing module 131, a service quality checking module 132, and a streaming data reproducing module 133. The session processing module 131 may perform, through the communication unit 110, a series of processes for connecting to the base station 200 and establishing a session with the streaming server 400 via the core network 500.

The service quality checking module 132 may identify a service quality, such as a resolution and a frame per second (fps), corresponding to a currently connected base station 200, or identify a service quality of the maximum bitrate, by using a network congestion status message received from the streaming server 400.

In addition, the service quality checking module 132 may identify a service quality for a neighboring cell disposed in a moving direction as well as a service quality for a currently connected cell.

The streaming data reproducing module 133 may request and receive streaming data, requested by the user, from the streaming server 400 via the communication unit 110 in a state where a session is established with the streaming server 400. In addition, the streaming data reproducing module 133 may support an MPEG-2 TS processing function capable of processing MPEG media transport streaming data. For example, the streaming data reproducing module 133 may receive an MMT packet composed of a plurality of media processing units (MPUs) from the streaming server 400. When the MMT packet is composed of a plurality of assets, the streaming data reproducing module 133 may perform a function of synchronizing, reproducing and outputting the plurality of assets, based on time information.

In addition, considering the mobility of the terminal 100, the streaming data reproducing module 133 may identify an appropriate service quality of a target cell of movement through the service quality checking module 132. Then, the streaming data reproducing module 133 may request and receive streaming data suitable for the identified service quality from the streaming server 400 through the communication unit 110.

The output unit 140 displays information about operation states, operation results, and the like that occur while functions of the terminal 100 are performed. In particular, the output unit 140 may display information generated by sequentially reproducing the streaming data received from the streaming server 400.

The storage unit 150 may store programs required for the functional operations according to embodiments of the present invention and also temporarily store various data generated during the execution of the programs. In particular, the storage unit 150 may store various instructions related to a streaming service according to embodiments of the present invention. Particularly, the storage unit 150 may store and manage network congestion status information 151.

As such, the main configuration of the terminal 100 have been described with reference to FIG. 9. However, elements of the terminal 100 shown in FIG. 9 are not always essential. Any element may be further included in the terminal 100, and some of shown elements may be omitted. For example, the terminal 100 may further include a sensor unit (not shown) capable of collecting various kinds of sensing information for checking the mobility of the terminal 100.

Now, the operations of the terminal 100 will be described with reference to FIG. 10. The terminal 100 may perform a process of connecting to the streaming server 400 according to a session establishment procedure (S601).

This process may be performed by executing an application for which the user of the terminal 100 wants to use a streaming service.

Then, the terminal 100 receives a network congestion status message from the streaming server 400 (S603). At this time, the terminal 100 may receive the network congestion status message for network congestion after sending a request for streaming data to the streaming server 400, or may receive the network congestion status message simultaneously with the connection with the streaming server 400. In addition, the terminal 100 may receive the network congestion status message for a congested cell only or for all cells. Also, the terminal 100 may receive the network congestion status message corresponding to a currently connected cell.

Thereafter, the terminal 100 identifies a service quality corresponding to the currently connected cell (S605), sends a request for streaming data of the identified service quality to the streaming server 400 (S607), and then receive and reproduce the requested streaming data (S609).

Meanwhile, the terminal 100 may move. When cell movement of the terminal 100 is detected (S611), the terminal 100 may identify a neighboring cell in a moving direction and then identify a service quality of the neighboring cell by using the network congestion status message received at the step S603 (S613).

If the service quality of the neighboring cell is lower than the service quality of the currently connected cell, the terminal 100 desires to use a streaming service by lowering the service quality before moving to the neighboring cell so as to minimize the deterioration of image quality that may occur when entering the neighboring cell. Thus, the terminal 100 requests streaming data of a service quality suitable for the neighboring cell (S615). Then, while receiving the streaming data having a changed service quality from the streaming server 400 and reproducing the received streaming data (S617), the terminal 100 performs the cell movement (S619). Therefore, it is possible to minimize the deterioration of image quality that can be caused due to the cell movement.

The main configuration and operating method of the terminal 100 according to an embodiment of the present invention have been described above. The terminal 100 described herein may be also referred to as a user equipment, a mobile station (MS), a mobile terminal (MT), a subscriber station (SS), a portable subscriber station (PSS), an access terminal (AT), or the like. In addition, the terminal 100 may be implemented as a mobile terminal such as a smart phone, a tablet PC, a personal digital assistant (PDA), or a portable multimedia player (PMP).

Hereinafter, a main configuration and operations of the cell management server 300 according to an embodiment of the present invention will be described.

Figure 11:
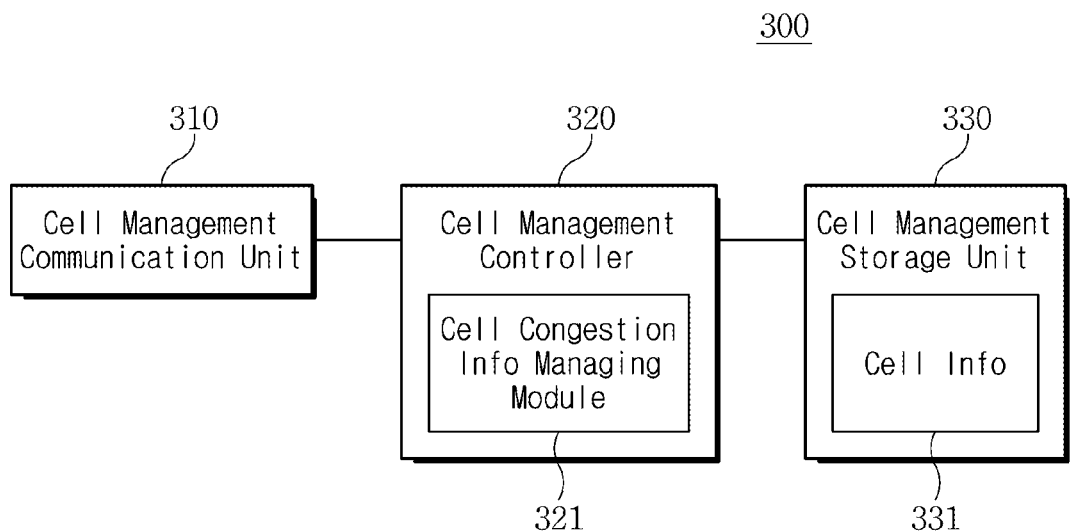
FIG. 11 is a block diagram illustrating a main configuration of a cell management server according to an embodiment of the present invention.
Figure 12:
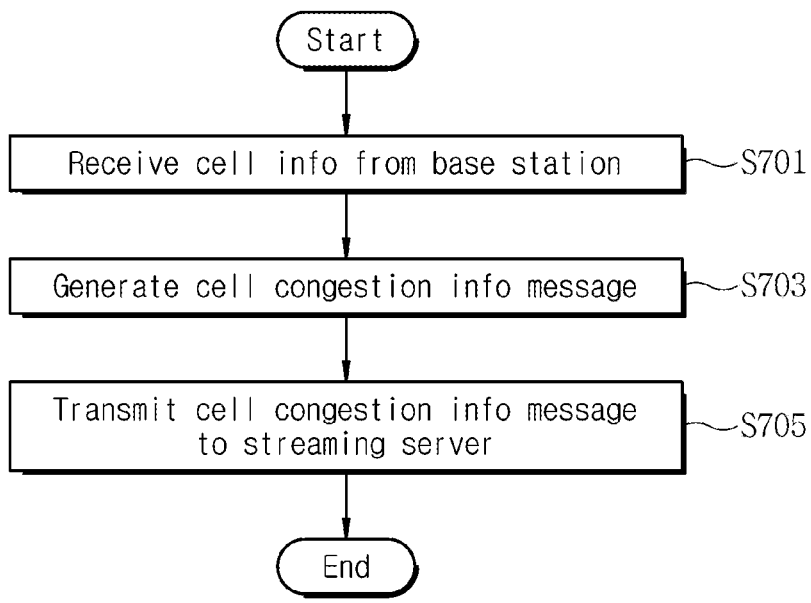
FIG. 12 is a flow diagram illustrating operations of a cell management server according to an embodiment of the present invention.

FIG. 11 is a block diagram illustrating a main configuration of a cell management server according to an embodiment of the present invention, and FIG. 12 is a flow diagram illustrating operations of a cell management server according to an embodiment of the present invention.

Referring to FIG. 11, the cell management server 300 according to an embodiment of the present invention may include a cell management communication unit 310, a cell management controller 320, and a cell management storage unit 330.

The cell management communication unit 310 receives cell information from a plurality of base stations 200 and also transmits a cell congestion information message, delivered from the cell management controller 320, to the streaming server 400.

The cell management controller 320 performs the overall control of the cell management server 300. In particular, the cell management controller 320 includes a cell congestion information managing module 321 and may control a process of generating a cell congestion information message and delivering it to the streaming server 400. The cell congestion information message is generated using cell information 331 received from the base station 200, and the cell information 331 may include cell identification information of the base station, cell congestion information, and information about a neighboring cell. The cell congestion information may mean, for example, but not limited to, the number of connected terminals 100. Based on various kinds of information, the cell congestion information may be defined and identified.

The cell management controller 320 may add a congestion level corresponding to the cell congestion information. Then, the cell management controller 320 may generate a cell congestion information message configured to contain the congestion level corresponding to the cell identification information. Also, the cell congestion information message may be configured to contain information about a neighboring cell corresponding to the cell identification information.

In addition, when the cell information 331 received from the base station 200 indicates that congestion information of a cell is less than a reference value, the cell management controller 320 may not generate the corresponding cell congestion information message. That is, only when the congestion level is equal to or higher than a predetermined level, the cell congestion information message may be configured and generated.

The cell management storage unit 330 stores and manages the cell information 331 received from the base station 200 as described above.

As described above, the cell management server 300 may receive cell information from the base station 200 (S701), generate a cell congestion information message by using the received cell information (S703), and transmit it to the streaming server (S705).

The cell management server 300 may periodically transmit the cell congestion information message to the streaming server 400, thus minimizing the occurrence of unnecessary traffic.

Hereinafter, a main configuration and operations of the streaming server 400 according to an embodiment of the present invention will be described.

Figure 13:
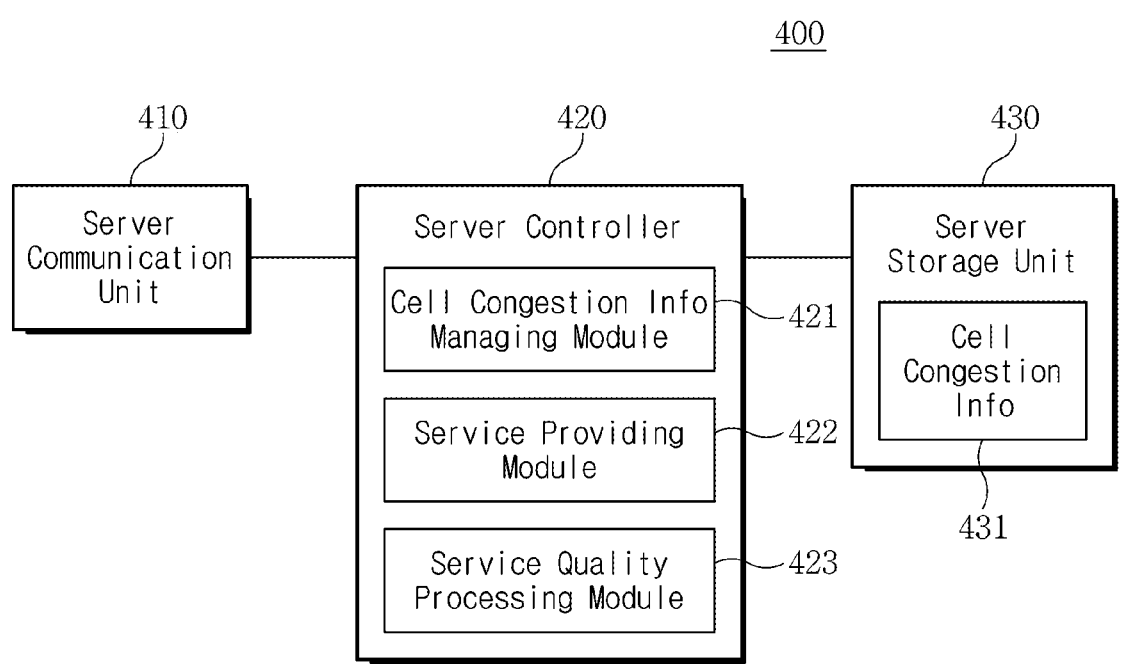
FIG. 13 is a block diagram illustrating a main configuration of a streaming server according to an embodiment of the present invention.
Figure 14:
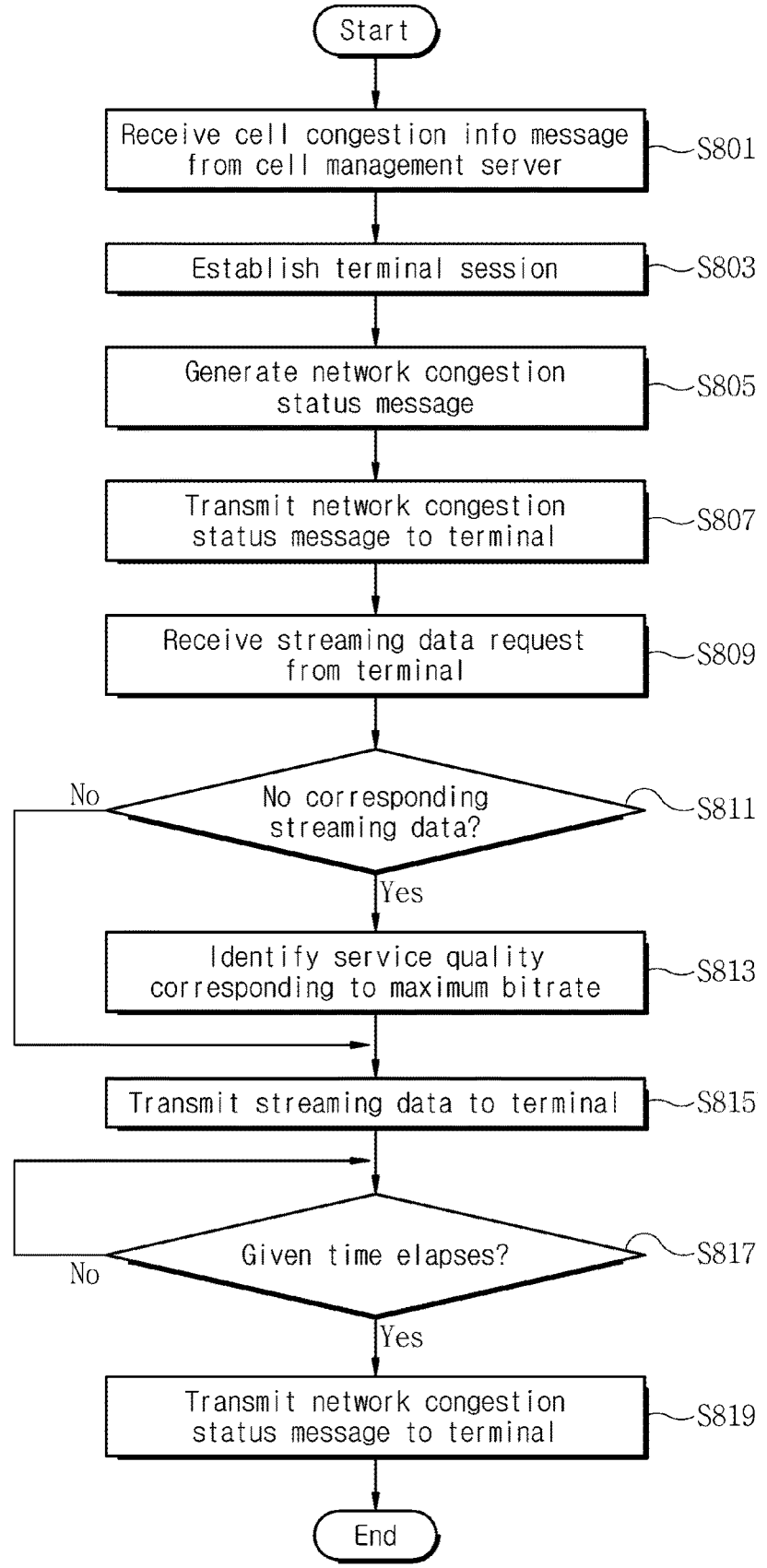
FIG. 14 is a flow diagram illustrating operations of a streaming server according to an embodiment of the present invention.

FIG. 13 is a block diagram illustrating a main configuration of a streaming server according to an embodiment of the present invention, and FIG. 14 is a flow diagram illustrating operations of a streaming server according to an embodiment of the present invention.

Referring to FIG. 13, the streaming server 400 may include a server communication unit 410, a server controller 420, and a server storage unit 430.

The server communication unit 410 transmits and receives information to and from the terminal 100 via the base station 200 and the core network 500. In particular, the server communication unit 410 may establish a control session with the terminal 100 to transmit/receive various kinds of information to/from the terminal 100, especially, to transmit streaming data to the terminal 100. In addition, the server communication unit 410 may exchange various kinds of information with the cell management server 300.

The server controller 420 is configured to perform the overall control of the streaming server 400 and may include a cell congestion information managing module 421, a service providing module 422, and a service quality processing module 423. The cell congestion information managing module 421 may store and manage a cell congestion information message received from the cell management server 300. In particular, the cell congestion information managing module 421 may store a congestion level corresponding to cell identification information in the cell congestion information 431 by matching a corresponding service quality to the congestion level. For example, when the cell congestion level is high, the corresponding service quality may be set to be a bitrate of LD-level 500 kbps.

The service providing module 422 performs the overall control of a streaming data transmission process. The service providing module 422 may connect a control session with the terminal 100, based on a 3-way handshaking scheme of TCP communication, and transmit a network congestion status message to the terminal 100. Also, in response to a request for transmission of streaming data corresponding to a service quality received from the terminal 100, the service providing module 422 may transmit the streaming data encoded according to the corresponding service quality.

The service quality processing module 423 may encode the streaming data according to the service quality. The service quality processing module 423 may perform a process of encoding the streaming data for each service quality, for example, FHD, HD, and SD, and then storing the encoded streaming data in the server storage unit 430. In addition, when the streaming data is not encoded in advance according to the service quality, the service quality processing module 423 may identify the maximum bitrate corresponding to the cell, and then transmit streaming data corresponding to a service quality lower than the maximum bitrate through the service providing module 422.

The server storage unit 430 may store and manage various types of information necessary for the operation of the streaming server 400. In particular, the server storage unit 430 may store cell congestion information 431 generated based on information collected from the cell management server 300.

The server storage unit 430 may include a program region and a data region. The program region stores information related to the operation of the streaming server 400. The data region stores various data generated according to the operation of the streaming server 400, especially, various instructions for processing the streaming data as described above. The server storage unit 430 may include a flash memory, a hard disk, a multimedia card micro type memory (e.g., an SD or XD memory), a RAM, a ROM, and the like.

The streaming server 400 has the same hardware configuration as that of a typical web server or a network server.

In addition, in the term of software, the streaming server 400 includes a program module implemented through a language such as C, C++, Java, Visual Basic, Visual C, or the like.

Now, a streaming service providing method of the streaming server 400 will be described with reference to FIG. 14. The streaming server 400 receives a cell congestion information message from the cell management server 300 (S801). This process may be performed periodically.

In addition, when a session is established with the terminal 100 according to the connection of the terminal 100 (S803), the streaming server 400 generates a network congestion status message (S805), and transmit it to the terminal 100 (S807).

Specifically, using information received from the cell management server 300, the streaming server 400 determines a service quality corresponding to a congestion level of a cell and then generates the network congestion status message that contains the determined service quality. The service quality may include information about a resolution and a frame per second (FPS), and may include only information about the maximum bitrate.

Then, the streaming server 400 may receive a request for streaming data corresponding to a specific service quality from the terminal 100 (S809), and transmit streaming data of the corresponding service quality to the terminal 100 (S815). If streaming data corresponding to a service quality requested by the terminal 100 is not encoded in advance (S811), the streaming server 400 may identify a service quality corresponding to the maximum bitrate (S813), and provide streaming data of a service quality lower than the maximum bitrate to the terminal 100.

A congested situation of the network may be changed from time to time. Therefore, when a predetermined time elapses (S817), the streaming server 400 may reconfigure the network congestion status message by using information received from the cell management server 300, and then transmit the reconfigured network congestion status message (S819).

In addition, the network congestion state message transmitted by the streaming server 400 may contain information about a neighboring cell adjacent to a connected cell to which the terminal 100 is currently connected. Through this, the terminal 100 continuously checks a change in a service quality in a moving environment and requests/receives suitable streaming data from the streaming server 400.

Meanwhile, although it has been described in an embodiment of the present invention that the streaming server 400 transmits the corresponding streaming data to the terminal 100 in response to a request of the terminal 100, the streaming server 400 may check the mobility of the terminal 100 and, when it is detected that the terminal 100 enters a congested cell, transmit streaming data to the terminal 100 in advance with a lower service quality corresponding to the congested cell.

Hereinbefore, the apparatus and method for providing the streaming service according to embodiments of the present invention have been described.

Although the present description and drawings illustrate exemplary device configurations, the functional operations and subject matter implementations described herein may be embodied in other types of digital electronic circuitry, or alternatively may be embodied in computer software, firmware, hardware, or a combination thereof including the structures disclosed herein and their equivalents. Implementations of the subject matter described herein may be embodied in at least one computer-readable medium, that is, at least one module of computer program instructions encoded on a storage medium to control or execute the operations of the apparatus according to the invention. The computer-readable medium may be a machine-readable storage device, a machine-readable storage substrate, a memory device, a composition of matter that affects the machine-readable propagation type signal, or a combination thereof.

In addition, the streaming data transmission method of the present invention may be provided in the form of a computer-readable medium suitable for storing computer program instructions and data. In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

INDUSTRIAL APPLICABILITY

The present invention relates to a streaming service and provides streaming data by adaptively changing a service quality in consideration of a congestion state of a cell. Therefore, by preventing a sudden change in image quality when a terminal enters a congested cell, the present invention can minimize the deterioration of image quality that can be perceived by a user, and also can provide a seamless streaming service.

In addition, the present invention can contribute to the development of the streaming service industry. Also, the present invention has a good possibility of sales on the market or business and therefore has industrial applicability suitable for practical and apparent implementation.

The invention claimed is:

1. A streaming service providing method of a terminal, the method comprising:

receiving a network congestion status message containing service quality information about at least one cell from a streaming server;

identifying a service quality corresponding to a neighboring cell located in a moving direction of the terminal, based on the network congestion status message; and requesting and receiving streaming data from the streaming server, based on the identified service quality corresponding to the neighboring cell.

2. The method of claim 1, wherein the network congestion status message is generated based on cell information received from a base station, and wherein the network congestion status message contains a maximum bitrate (Max_bitrate) corresponding to at least one cell identification information (C_ID), or contains a maximum bitrate (Maximum_rate) corresponding to a mobile information descriptor (mobile_info_descriptor) including at least one cell identification information (current_cell_id).

3. The method of claim 2, wherein the requesting and receiving streaming data includes:

transmitting a request for streaming data corresponding to the maximum bitrate to the streaming server; and receiving streaming data corresponding to the maximum bitrate or less from the streaming server.

4. The method of claim 1, wherein the network congestion status message contains, as the service quality information, a resolution (Forced_resolution) and frames per second (Forced_fps) both of which correspond to at least one cell identification information, and wherein the requesting and receiving streaming data includes:

transmitting a request for streaming data corresponding to the resolution and the frames per second to the streaming server; and receiving streaming data corresponding to the resolution and the frames per second from the streaming server.

5. The method of claim 1, further comprising:

after the requesting and receiving streaming data, performing connection with the neighboring cell and then, when determining that the terminal gets out of the neighboring cell, requesting and receiving streaming data corresponding to an original service quality.

6. A streaming service providing method of a streaming server, the method comprising:

identifying a cell congestion information message generated using cell information received from a base station;

configuring, by using the cell congestion information message, a network congestion status message containing service quality information about at least one cell;

transmitting the generated network congestion status message to a terminal; and transmitting streaming data according to the network congestion status message in response to a request of the terminal.

7. The method of claim 6, wherein the cell congestion information message is generated to contain cell identification information (C_ID) identified through the cell information received from the base station, a congestion level (Congestion_level) indicating a degree of congestion of a cell corresponding to the cell identification information, an event time (event_time), and an expiration time (expire_time).

8. The method of claim 6, wherein the cell congestion information message is generated to contain a mobile information descriptor (mobile_info_descriptor) including cell identification information (current_cell_id) identified through the cell information received from the base station, network level information (levelOfnetworkstatus) about a congestion level of a cell corresponding to the cell identification information, a reporting time (reportingTime), and a valid duration (validDuration).

9. The method of claim 6, wherein the network congestion status message is configured to contain a maximum bitrate indicating a service quality determined in correspondence with the cell congestion information message, or configured to contain a resolution (Forced_resolution) and frames per second (Forced_fps).

10. The method of claim 9, wherein the network congestion status message is configured to further contain subscriber type information (priority_type) and a private field (private_field) including an application ID and a channel list, or configured to further contain a valid duration (validDuration) and a private length (private_length).

11. The method of claim 10, wherein the transmitting streaming data includes:

checking the subscriber type information (priority_type) and the private field (private_field) or checking the private_length, and transmitting the streaming data according to a service quality corresponding to a result of the checking when the checking result satisfies a predetermined condition.

12. The method of claim 6, wherein the transmitting streaming data includes:

when a request for transmission of streaming data corresponding to the network congestion status message is received from the terminal, determining whether there is streaming data corresponding to a maximum bitrate, and when there is no streaming data corresponding to the maximum bitrate, transmitting streaming data lower than the maximum bitrate to the terminal.

13. A terminal comprising:

a communication unit transmitting and receiving information to and from a streaming server; and a controller configured to receive a network congestion status message containing service quality information about at least one cell from a streaming server, to identify a service quality corresponding to a neighboring cell located in a moving direction of the terminal, based on the network congestion status message, and to request and receive streaming data from the streaming server, based on the identified service quality corresponding to the neighboring cell.

14. A streaming server comprising:

a server communication unit transmitting and receiving information to and from a terminal and transmitting streaming data to the terminal; and a server controller configured to identify a cell congestion information message generated using cell information received from a base station, to configure, by using the cell congestion information message, a network congestion status message containing service quality information about at least one cell, to transmit the generated network congestion status message to a terminal, and to transmit streaming data according to the network congestion status message in response to a request of the terminal.

* * * * *